(12) United States Patent
Sakamoto et al.

(10) Patent No.: US 7,769,304 B2
(45) Date of Patent: Aug. 3, 2010

(54) SIGNAL LIGHT PROCESSING APPARATUS

(75) Inventors: Hisaya Sakamoto, Kawasaki (JP); Toru Yamazaki, Kawasaki (JP); Yoshito Anazawa, Kawasaki (JP); Hiroshi Kuzukami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 669 days.

(21) Appl. No.: 11/645,712

(22) Filed: Dec. 27, 2006

(65) Prior Publication Data
US 2007/0146795 A1 Jun. 28, 2007

(30) Foreign Application Priority Data
Dec. 28, 2005 (JP) ............................. 2005-378911

(51) Int. Cl.
*H04B 10/06* (2006.01)
(52) U.S. Cl. .................... 398/202; 398/208; 375/317; 375/318; 375/319
(58) Field of Classification Search ......... 398/202–214; 375/317–319
See application file for complete search history.

(56) References Cited

U.S. PATENT DOCUMENTS

| | | | | |
|---|---|---|---|---|
| 5,892,609 | A * | 4/1999 | Saruwatari | 398/202 |
| 6,134,279 | A * | 10/2000 | Soichi et al. | 375/341 |
| 6,151,150 | A * | 11/2000 | Kikuchi | 398/209 |
| 6,671,075 | B1 * | 12/2003 | Mizunaga | 398/202 |
| 6,907,202 | B1 * | 6/2005 | Ide et al. | 398/208 |
| 7,424,230 | B2 * | 9/2008 | Tomizawa et al. | 398/202 |
| 7,492,834 | B2 * | 2/2009 | Omori | 375/317 |
| 2003/0161640 | A1 * | 8/2003 | Kimura | 398/202 |
| 2003/0229461 | A1 * | 12/2003 | Fujisaku | 702/66 |
| 2003/0231032 | A1 * | 12/2003 | Tanaka | 327/72 |

FOREIGN PATENT DOCUMENTS

| | | |
|---|---|---|
| JP | 9181687 | 7/1997 |
| JP | 11346194 | 12/1999 |
| JP | 2003304202 | 10/2003 |
| JP | 2004015587 | 1/2004 |

OTHER PUBLICATIONS

Extended European Search Report dated Dec. 28, 2007 in corresponding European Patent Application No. 0602700.6 (7 pages).
Y. Okubo, "Optical Receiver", Japanese Patent Laid-Open (kokai) No. HEI 11-346194, Dec. 14, 1999, Abstract.
M. Katayama "Burst Light Receiver", Japanese Patent Laid-Open (kokai) No. 2003-304202, Oct. 24, 2003, Abstract.
Y. Fujisaki, "Discrimination Threshold Setting Circuit and DC Level Shift Circuit", Japanese Patent Laid-Open (kokai) No. 2004-015587, Jan. 15, 2004, Abstract.
T. Saito et al., "Burst Digital Optical Receiver", Japanese Patent Laid-Open (kokai) No. HEI 09-181687, Jul. 11, 1997, Abstract.

* cited by examiner

*Primary Examiner*—Ken N Vanderpuye
*Assistant Examiner*—Tanya Ngo
(74) *Attorney, Agent, or Firm*—Fujitsu Patent Center

(57) ABSTRACT

A signal processing apparatus sets a discrimination level most suitably, regardless of whether the apparatus is in the minimum receiving system or the maximum receiving system. The apparatus comprises a light receiving unit converting input signal light to an electric signal, and a level detecting unit for detecting a high level component and a low level component of the electric signal from the light receiving unit, along with peak levels on a high-side and a low-side of the electric signal.

16 Claims, 13 Drawing Sheets

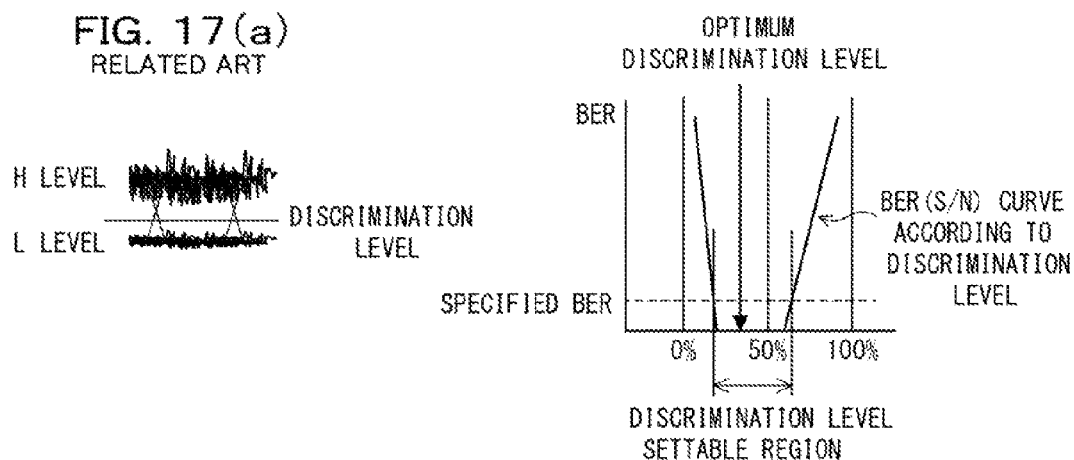
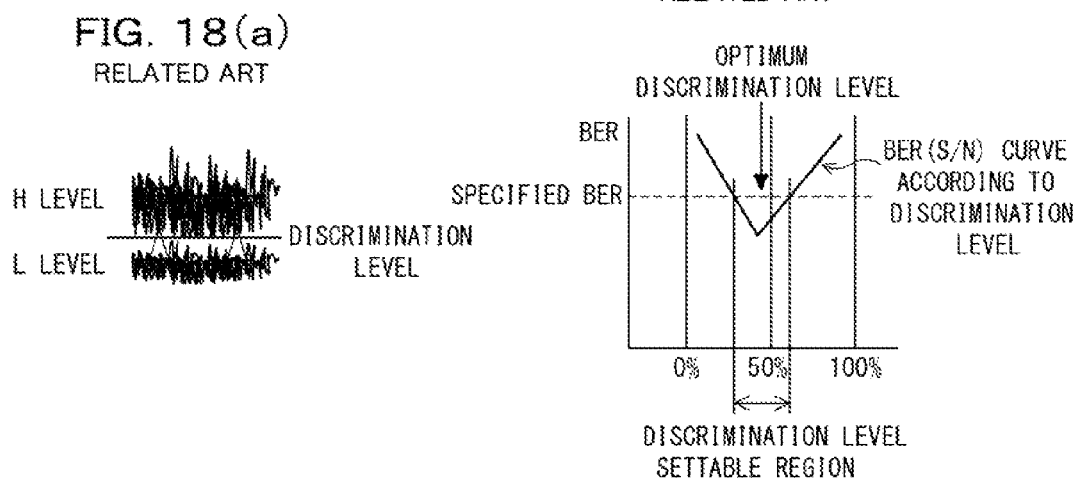

SIGNAL LIGHT PROCESSING APPARATUS

BACKGROUND OF THE INVENTION

1) Field of the Invention

The present invention relates to a signal light processing apparatus and more particularly to a signal light processing apparatus suitable for use in a receiving system in an optical communication system.

2) Description of the Related Art

In a general optical communication system, an optical receiving apparatus 100 shown in FIG. 15, for example, receives signal light transmitted through an optical fiber, which is a transmission path. In the optical receiving apparatus 100, a photoelectric converter 101 such as an APD (Avalanche Photo Diode) or the like receives the signal light transmitted through the transmission path and converts the signal light into an electric current signal. A preamplifier 102 converts the electric current signal into a voltage signal and amplifies the voltage signal. A slicing amplifier 103 further amplifies the voltage signal, and outputs the voltage signal to both a flip flop 104 for regenerating a data signal (DATA) and a clock extractor 105 for regenerating a clock signal (CLK).

At this time, the slicing amplifier 103 can convert the voltage signal fed from the preamplifier 102 into a voltage signal of a rectangular wave according to the magnitude of a predetermined discrimination level generated by a discrimination level generating source 103A, and output it to the flip flop (F/F) 104 and the clock extractor 105. Whereby, the slicing amplifier 103 can practically detect a binary signal (main signal data) modulated on the signal light as the voltage signal of the rectangular wave.

In recent optical communication systems such as WDM transmission systems, OSNR (Optical Signal to Noise Ratio) of signal light inputted to the optical receiving apparatus 100 largely changes according to the transmission distance, system configuration and functions. For the discrimination level generated by the discrimination level generating source 103A, an optimum value is determined according to the OSNR in an optical communication system in which the optical receiving apparatus 100 is disposed.

For instance, the optical receiving apparatus 100 in an optical communication system having a relatively small number of stages of optical amplifiers interposed on the transmission path receives signal light having such characteristics that the noise is relatively small (that is, the S/N is excellent) but the receiving level is relatively small. Particularly, the optical receiving apparatus 100 in a minimum receiving system in which no optical amplifier is interposed receives signal light at an extremely small receiving level.

FIG. 17(a) shows an example of eye patterns of such received signal light, and FIG. 17(b) shows BER (or S/N) characteristic of the signal light according to the discrimination level setting value. As shown in FIG. 17(b), when signal light having small noise is received, the S/N is excellent if the input level is relatively large, the V-characteristic of the discrimination level setting curve is steep, a range of the valley of the V being wide and deep.

Accordingly, a settable range of the discrimination level satisfying BER (specified BER) specified by ITU-T (International Telecommunication Union Telecommunication Standardization sector) can be set within a relatively wide range between an optical level at which data of "1" has been modulated and an optical level at which data of "0" has been modulated.

However, when the receiving level is smaller, a difference between the optical levels at which data of "1" and "0" have been modulated is smaller, which leads to a narrower eye opening due to noise appearing in the vicinity of these levels. Thus, it becomes necessary to accurately adjust the setting of the data discrimination level. Since noise components appearing in the vicinity of an optical level at which data of "1" has been modulated are generally at a larger level than noise components appearing in the vicinity of an optical level at which data of "0" has been modulated, the discrimination level is required to be offset below the intermediate point between the above "1" level and "0" level, that is, below a 50-percent level.

In this case, when the average optical input power is 10 dBm, for example, the input amplitude of the slicing amplifier is 100 mVpp. And, when the discrimination level voltage is set at a 40-percent level of a difference between the above levels, it is sufficient to give an offset of 100 mV, for example, from the 50-percent level. If the above average optical input power is so small as 20 dBm, it is necessary to give an offset of 10 mV, for example, which is a relatively high-accurate offset, from the 50 percent level when the discrimination level voltage is set at a level of 40 percent like the above case.

To the contrary, the optical receiving apparatus 100 in an optical communication system in which a relatively large number of stages of optical amplifiers are disposed on the transmission path, that is, a maximum receiving system, receives signal light having such characteristics that the noise is relatively large due to ASE light and the like generated in the optical amplifiers (that is, the S/N is not excellent) and the receiving level is relatively large. FIG. 18(a) shows an example of eye patterns of such received signal light, and FIG. 18(b) shows a BER (or S/N) characteristic of the signal light according to the discrimination level set value.

As shown in FIG. 18(b), when signal light inputted through a transmission path having a large number of stages of optical amplifiers interposed, the S/N is deteriorated, thus the V-characteristic of the discrimination level set curve is smooth, which leads to a shallow region of the V. Since the receiving level is relatively large, the optical levels at which data of "1" and "0" have been modulated are large, but the noise levels appearing in the vicinity of the optical levels of "1" and "0" are large, as well (because the V-characteristic itself is deteriorated). Accordingly, a settable range of the discrimination level satisfying the specified BER is estimated to be narrower than the case shown in FIG. 17(b) (within a range based on the ratio).

As above, an optimum value of the discrimination level is set according to OSNR in an optical communication system in which the optical receiving apparatus 100 is disposed. In order to provide the optical receiving apparatus 100 that can be mounted in various types of communication system, setting of the discrimination level generated by the discrimination level generating source 103A is provided in menu for each type of the apparatus, and a relatively large number of types of the apparatus having various discrimination levels are prepared in the product menu when products of the optical receiving apparatus are provided. However, such preparation of a relatively large number of variations of the setting of the discrimination level causes an increase in developing cost and management cost due to an increase in types of the apparatus.

If various setting of the discrimination level in the optical receiving apparatus is prepared in order that excellent discrimination level can be set in both the minimum receiving system and the maximum receiving system, an increase in cost due to such an increase in type becomes a more serious problem.

From the above drawbacks, it is desired to monitor the S/N of signal light inputted to the optical receiving apparatus to control the discrimination level, whereby the number of types of the setting of the discrimination level is decreased while the discrimination level is set optimally regardless of whether the optical receiving apparatus is disposed in the minimum receiving system or in the maximum receiving system to realize a general-purpose apparatus.

FIG. 16 is a block diagram showing an optical receiving apparatus 110 to which a structure controls the discrimination level is applied. In the optical receiving apparatus 110 shown in FIG. 16, the part consisting of the slicing amplifier 103, the discrimination level generating source 103A, the flip flop 104 and the clock detecting unit 105 is shown as a discriminator 113.

In the optical receiving apparatus 110, a DEMUX 106 converts a signal whose data has been regenerated by the flip flop 104 configuring the discriminator 113 into parallel data in N columns, and an FEC (Forward Error Correction) 107 performs error correction on the parallel data. An error information extracting unit 108 extracts information about the number of times the error correction has been performed by the FEC 107, and a discrimination level operation controlling unit 109 operates and controls the discrimination level to be used in the discriminator 113, by using the error information extracted by the error information extracting unit 108 as parameter.

Such error correction by the FEC 107 relieves BER required in the discrimination stage of the received signal light as compared with a case where the error correction by the FEC 107 is not performed. In other words, in order to satisfy the specified BER, the level of BER specified for discrimination by the discriminator 113 is relieved as compared with a case where the error correction is not performed in the later stage. Particularly, it is possible to widen the setting range of the discrimination level when the discriminator 113 performs discrimination on received signal light transmitted through a transmission path on which an optical amplifier is interposed [refer to FIGS. 18(a) and 18(b)].

Meanwhile, as to an optical receiving apparatus in an optical communication system, the transmission distance (that is, a length of the transmission path fiber between regenerative repeaters) is limited due to deterioration of the received waveform caused by the dispersion characteristic of the transmission path fiber. For example, signal light having an eye pattern shown in FIG. 19(a) before the signal light is transmitted is deteriorated to one shown in FIG. 19(b) or 19(c), for example, because of the dispersion characteristic of the transmission path fiber.

It has been examined to provide a function of compensating received waveform deterioration caused by the dispersion characteristic of the transmission path fiber to the optical transmission apparatus on the receiving side. By providing the function of compensating the received waveform deterioration, it is possible to improve the functions of the optical transmission apparatus and increase the length of the transmission path fiber.

FIGS. 20(a) through 20(c) are diagrams showing examples where there are given to respective optical transmission apparatuses 122A to 122C on the receiving side functions of compensating the received waveform deterioration when the optical transmission apparatuses 122A to 122C receive signal light outputted from transmission units 121a in optical transmission apparatuses 121 on the transmitting side in optical communication systems, in which the optical transmission apparatuses 121 on the transmitting side are connected to the optical transmission apparatuses 122A to 122C through transmission path fibers 120, respectively.

In the optical transmission apparatus 122A shown in FIG. 20(a), a dispersion compensating fiber 122c is interposed between an optical amplifier 122a and an optical receiving unit 122b. In the optical transmission apparatus 122B shown in FIG. 20(b), an optical dispersion compensator 122d is interposed between the optical amplifier 122a and the optical receiving unit 122b. In the optical transmission apparatus 122C shown in FIG. 20(c), an electric dispersion compensator 122b-3 is disposed between a light receiving unit 122b-1 and a discriminating/regenerating unit 122b-2. The light receiving unit 122b-1, the discriminating/regenerating unit 122b-2 and the electric dispersion compensator 122b-3 are forming an optical receiving unit 122b' in the following stage of the optical amplifier 122a.

As known techniques relating to this invention, there are techniques described in following patent documents 1 through 4:

[Patent Document 1] Japanese Patent Application Laid-Open Publication No. H11-346194

[Patent Document 2] Japanese Patent Application Laid-Open Publication No. 2003-304202

[Patent Document 3] Japanese Patent Application Laid-Open Publication No. 2004-15587

[Patent Document 4] Japanese Patent Application Laid-Open Publication No. H09-181687

As to the apparatus shown in FIG. 16, since it is necessary to encode the main signal with a unique FEC code in both the optical transmitting apparatus and the optical receiving apparatus, the apparatus shown in FIG. 16 is difficult to be disposed opposite to an apparatus without the corresponding FEC encoding/decoding function. Therefore, a problem may be encountered when the apparatus is connected to an existing apparatus or a different system vendor.

To overcome this problem, it is possible to integrate a device having the FEC function in the optical module to enable connection of the apparatus to an existing apparatus by only exchanging the parts of the apparatus. However, the size of an integrated circuit having the FEC function is considerable, which leads to an increase in size of the optical module when such integrated circuit device is integrated in the optical module.

When the dispersion compensating fiber 122c is interposed to compensate waveform deterioration as shown in FIG. 20(a), it is necessary to prepare a menu of the dispersion compensating fiber corresponding to the length of the transmission path fiber to cope with the dispersion characteristic that differs according to the length of the transmission path fiber, which leads to an increase in the manufacturing cost when the apparatus is produced.

When the optical dispersion compensator 122d is interposed as shown in FIG. 20(b), it is difficult to automatically set the compensation amount because the degree of waveform deterioration is difficult to be detected. When the electric dispersion compensator 122b-3 is provided in the optical receiving unit 122b' as shown in FIG. 20(c), the control for compensating the amount of waveform deterioration is unstable because the waveform deterioration is compensated on the basis of a signal containing both the waveform deterioration amount and the noise components.

The inventions described in the Patent Documents 1 through 4 fail to provide a technique that can attain optimum setting of the discrimination level regardless of whether the optical communication system is in the minimum receiving system or the maximum receiving system, and can extract the amount of waveform deterioration from a received signal waveform.

SUMMARY OF THE INVENTION

In the light of the above drawbacks, an object of the present invention is to set most suitably the discrimination level, regardless of whether the signal processing apparatus is disposed in the minimum receiving system or in the maximum receiving system.

Another object of the present invention is to be able to take out a waveform distortion amount due to dispersion in the transmission fiber from a received signal waveform.

Therefore, the present invention provides a signal light processing apparatus comprising a light receiving unit for converting input signal light to an electric signal having an intensity corresponding to a level of the received signal light, and a level detecting unit for detecting a high level component and a low level component of the electric signal from the light receiving unit, and peak levels on a high side and a low side of the electric signal.

Preferably, the signal light processing unit has a means for operating an optimum setting of the discrimination level from the high level and the low level, the peak levels containing noise of the inputted signal light, and a required discrimination level, and controlling the discrimination level.

Further preferably, the level detecting unit comprises a high-level signal detecting unit for detecting the high level of the binary signal modulated on the signal light, a low-level signal detecting unit for detecting the low level of the binary signal modulated on the signal light, a high-side noise peak detecting unit for detecting the peak level of the electric signal containing the noise in a high-level area of the binary signal modulated on the signal light, and a low-side noise peak detecting unit for detecting the peak level of the electric signal containing the noise in a low-level area of the binary signal modulated on the signal light.

In which case, the high-side noise peak level detecting unit and the low-side noise peak level detecting unit may detect the peak levels of the electric signal containing the noise so as to meet a bit error rate required when data of the signal light is regenerated.

The light receiving unit may comprise a light receiving element for converting the signal light to an electric signal, and an amplifying unit for amplifying the electric signal from the light receiving element, and outputting a non-inverted signal according to a binary signal pattern of the main signal and an inverted signal obtained by inverting the binary signal pattern as amplified electric signals, the level detecting unit may comprise a first half-wave rectifier circuit for half-wave-rectifying the non-inverted signal, and a second half-wave rectifier circuit for half-wave-rectifying the inverted signal, the high-level signal detecting unit may detect the high level on the basis of an output from the first half-wave rectifier circuit, and the high-side noise peak detecting unit may detect the peak level on the high side of the electric signal containing noise on the basis of the output from the first half-wave rectifier circuit, the low-level signal detecting unit may detect the low level on the basis of an output from the second half-wave rectifier circuit, and the low-side noise peak detecting unit may detect the peak level on the low side of the electric signal containing noise on the basis of the output from the second half-wave rectifier circuit.

The high-level signal detecting unit may comprise a first filter having a transmission band set to one-half or less of a frequency band of the main signal to transmit the output from the first half-wave rectifier circuit, and a first peak detecting unit for detecting a peak level of components transmitted through the first filter, the high-side noise peak detecting unit may comprise a second filter having a transmission band set to the frequency band or less of the main signal to transmit the output from the first half-wave rectifier circuit, and a second peak detecting unit for detecting a peak level of components transmitted through the second filter, the low-level signal detecting unit may comprise a third filter having a transmission band set to one-half or less of the frequency band of the main signal to transmit the output from the second half-wave rectifier circuit, and a third peak detecting unit for detecting a peak level of components transmitted through the third filter, and the low-side noise peak detecting unit may comprise a fourth filter having a transmission band set to the frequency band or less of the main signal to transmit the output from the second half-wave rectifier circuit, and a fourth peak detecting unit for detecting a peak level of components transmitted through the fourth filter.

The signal light processing apparatus may further comprise a discriminator for comparing a magnitude of a level of the electric signal outputted from the light receiving unit with a magnitude of a discrimination level to regenerate data, and a discrimination level operation controlling unit for calculating the discrimination level by using the high level and the low level of the binary signal modulated on the signal light, and the electric signal levels contained in the high side and the low side of the binary signal detected by the level detecting unit, and setting the discrimination level to the discriminator.

The signal light processing apparatus may still further comprise a discriminator for comparing a magnitude of a level of the electric signal outputted from the light receiving unit with a magnitude of a discrimination level to regenerate data, a discrimination level operation controlling unit inputted the peak levels from the first peak detecting unit and the third peak detecting unit as the high level and the low level of the binary signal modulated on the signal light, and the peak levels from the second peak detecting unit and the fourth peak detecting unit as the electric signal levels contained in the high side and the low side of the binary signal, calculating the discrimination level by using the levels, and setting the discrimination level to the discriminator, and a detection time setting unit for setting a time for which the peak levels are detected by the first to fourth peak detecting units.

The time set by the detection time setting unit may be set according to a bit rate of the main signal, and a bit error rate of data regenerated by the discriminator. In this case, it is preferable that the detection time setting unit sets the time on the basis of the bit rate of the main signal so that the time is practically equal to a time for which one bit error occurs in data regenerated by the discriminator.

The discrimination level operation controlling unit may specify a level area obtained by removing levels of noise signals contained in the high side and the low side from a level area between the high level and the low level of the binary signal modulated on the signal light, and calculate an intermediate point in the specified level area as the discrimination level.

The level detecting unit may further comprise a high-side high-frequency level detecting unit for detecting a level of high-frequency components contained in the high side of the electric signal from the light receiving unit, and a low-side high-frequency level detecting unit for detecting a level of high-frequency components contained in the low side of the electric signal from the light receiving unit, a high-side waveform distortion deriving unit for determining waveform distortion components contained in the high side of the binary signal by subtracting a level of high-side noise components from the level of the high-frequency components detected by the high-side high-frequency level detecting unit, and a low-side waveform distortion deriving unit for determining waveform distortion components contained in the low side of the binary signal by subtracting a level of low-side noise components from the level of the high-frequency components detected by the low-side high-frequency level detecting unit.

The signal light processing apparatus may have a means for operating an optimum setting of a distortion compensation amount in an electric dispersion compensation equalizer integrated in a receiver from waveform distortion information on the inputted signal light and controlling the distortion compensation amount, or a means for operating an optimum setting of a distortion compensation amount in an optical dispersion compensator disposed in front of an inputting unit of a receiver from waveform distortion information on the inputted signal light and controlling the distortion compensation amount.

The light receiving unit may comprise a light receiving unit for converting the signal light to an electric signal, and an amplifying unit for amplifying the electric signal from the light receiving element, and outputting a non-inverted signal according to a binary signal pattern of the main signal and an inverted signal obtained by inverting the binary signal pattern as amplified electric signals, the level detecting unit may comprise a first half-wave rectifier circuit for half-wave-rectifying the non-inverted signal, and a second half-wave rectifier circuit for half-wave-rectifying the inverted signal, the high-level signal detecting unit may detect the high level on the basis of an output from the first half-wave rectifier circuit, the high-side noise peak detecting unit may detect a peak level on the high side of the electric signal containing the noise on the basis of the output from the first half-wave rectifier circuit, the high-side high-frequency level detecting unit may detect a level of the high-frequency components in the output from the first half-wave rectifier circuit, and the low-level signal detecting unit may detect the low level on the basis of an output from the second half-wave rectifier circuit, the low-side noise peak detecting unit may detect the peak level on the low side of the electric signal containing the noise on the basis of the output from the second half-wave rectifier circuit, and the low-side high-frequency level detecting unit detects a level of the high-frequency components in the output from the second half-wave rectifier circuit.

In this case, the high-level signal detecting unit may comprise a first filter having a transmission band set to one-half or less of a frequency band of the main signal to transmit the output from the first half-wave rectifier circuit, and a first peak detecting unit for detecting a peak level of components transmitted through the first filter, the high-side noise peak detecting unit may comprise a second filter having a transmission band set to the frequency band or less of the main signal to transmit the output from the first half-wave rectifier circuit, and a second peak detecting unit for detecting a peak level of components transmitted through the second filter, the low-level signal detecting unit may comprise a third filter having a transmission band set to one-half or less of the frequency band of the main signal to transmit the output from the second half-wave rectifier circuit, and a third peak detecting unit for detecting a peak level of components transmitted through the third filter, the low-side noise peak detecting unit may comprise a fourth filter having a transmission band set to the frequency band or less of the main signal to transmit the output from the second half-wave rectifier circuit, and a fourth peak detecting unit for detecting a peak level of components transmitted through the fourth filter, the high-side high-frequency level detecting unit may comprise a fifth filter having a transmission band set to a high-frequency band centered at the frequency band of the main signal to transmit the output from the first half-wave rectifier circuit, and a fifth peak detecting unit for detecting a peak level of components transmitted through the fifth filter, and the low-side high-frequency level detecting unit may comprise a sixth filter having a transmission band set to a high-frequency band centered at the frequency band of the main signal to transmit the output from the second half-wave rectifier circuit, and a sixth peak detecting unit for detecting a peak level of components transmitted through the sixth filter.

The signal light processing apparatus may still further comprise a first waveform distortion compensating unit for compensating waveform distortion components contained in the electric signal from the light receiving unit with an electric amount, and a first waveform distortion compensation controlling unit for controlling a compensation amount in the first waveform distortion compensating unit on the basis of the waveform distortion components obtained by the high-side waveform distortion deriving unit and the low-side waveform distortion deriving unit.

The signal light processing apparatus may still further comprise a second waveform distortion compensating unit for optically compensating waveform distortion components contained in signal light before received by the light receiving unit, and a second waveform distortion compensation controlling unit for controlling a compensation amount in the second waveform distortion compensating unit on the basis of the waveform distortion components obtained by the high-side waveform distortion deriving unit and the low-side waveform distortion deriving unit.

According to this invention, the level detecting unit can detect the high level and the low level forming binary signal components, and the peak levels of the electric signal on both the high side and the low side of the electric signal from the light receiving unit. It is thus possible to determine an amplitude value of actual data components of the electric signal photo-electric-converted, and an amplitude value of noise actually contained in the electric signal by using the detected levels, thereby readily determining, from these amplitude values, a discrimination level at which an effect of the noise is most suitable under conditions of the specified BER.

According to this invention, the level detecting unit can detect the high level ("1" level) and the low level ("0" level) forming binary signal components modulated on an electric signal from the light receiving unit, the peak levels of the electric signal on both the high side and the low side forming the binary signal, with high accuracy, and high frequency components contained in the electric signal from the light receiving unit on the high level side and the low level side, separately. It is thus possible to determine a waveform distortion amount from the detected peak levels, the "1" and "0" levels and high frequency components through a simple operation.

BRIEF DESCRIPTION OF THE DRAWINGS

FIGS. 17(a), 17(b), 18(a), 18(b) and 19(a) through 19(c) are diagrams for illustrating drawbacks of the known techniques.

DESCRIPTION OF THE PREFERRED EMBODIMENTS

Hereinafter, embodiments of the present invention will be described with reference to the accompanying drawings.

In addition to the above objects of the present invention, other technical problem, a means for solving the technical problem and its working effect will be apparent from disclosure of the embodiments.

[A] Description of First Embodiment

Figure 1:
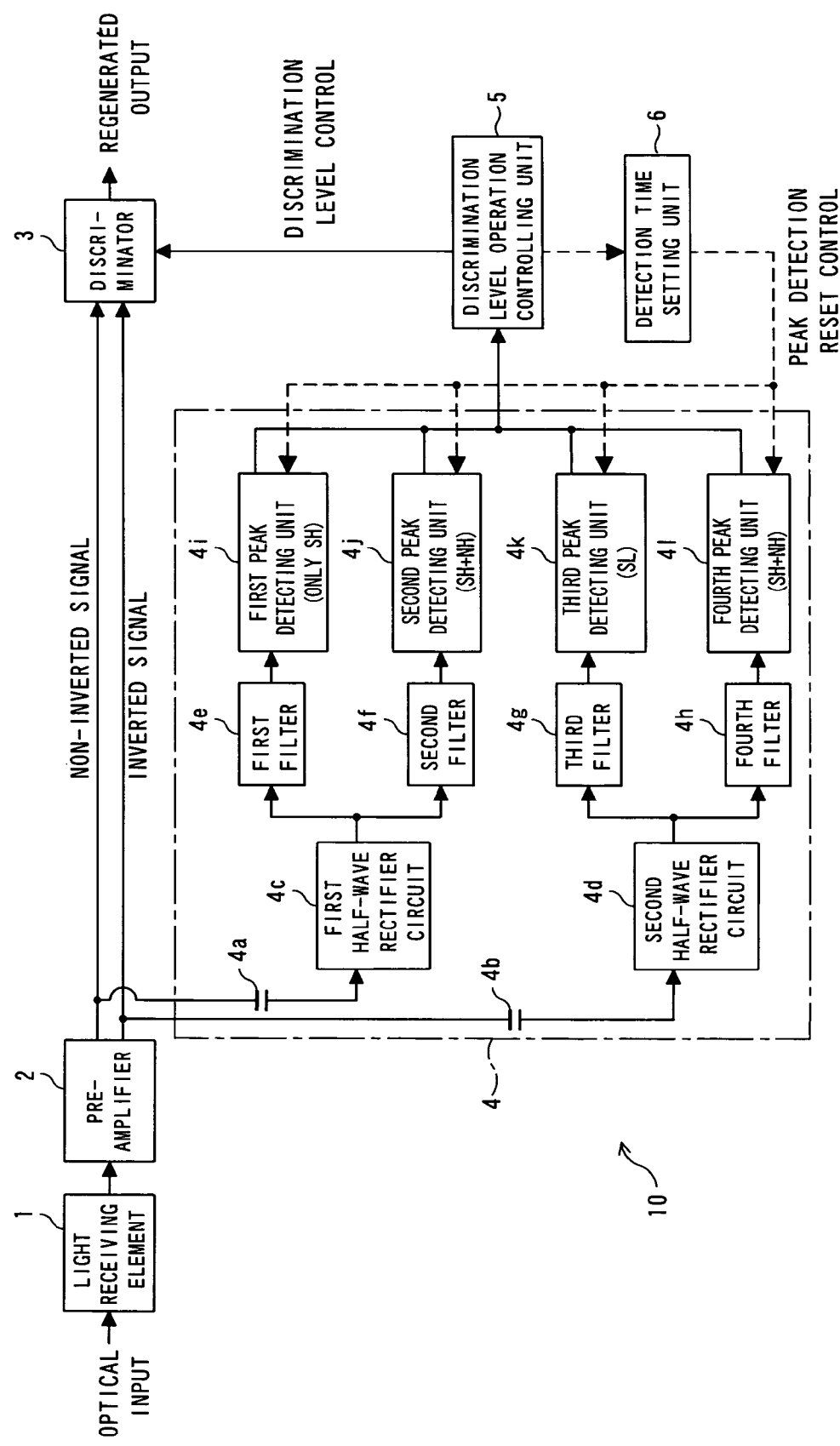
FIG. 1 is a block diagram showing a signal light processing apparatus according to a first embodiment of this invention.

FIG. 1 is a block diagram showing a signal light processing apparatus 10 according to a first embodiment of this invention. The signal light processing apparatus 10 shown in FIG. 1 can be applied as an optical receiving apparatus in an optical communication system. Namely, an optical transmitting apparatus generates signal light on which a binary signal, which is a data signal, is modulated and transmits the generated signal light, whereas the signal light processing apparatus 10, which is an optical receiving apparatus, receives the signal light from the optical transmitting apparatus through a transmission path.

The signal light processing apparatus 10 comprises a light receiving element 1, a preamplifier 2, a discriminator 3, an S/N monitoring unit 4, a discrimination level operation controlling unit 5 and a detection time setting unit 6. The light receiving element 1 is configured with an APD (Avalanche Photo Diode) or the like to receive transmission signal light (hereinafter, referred to simply as signal light) transmitted from an optical transmitting apparatus of an optical communication system through a transmission path not shown, and converts the signal light into an electric current signal.

Figure 2:
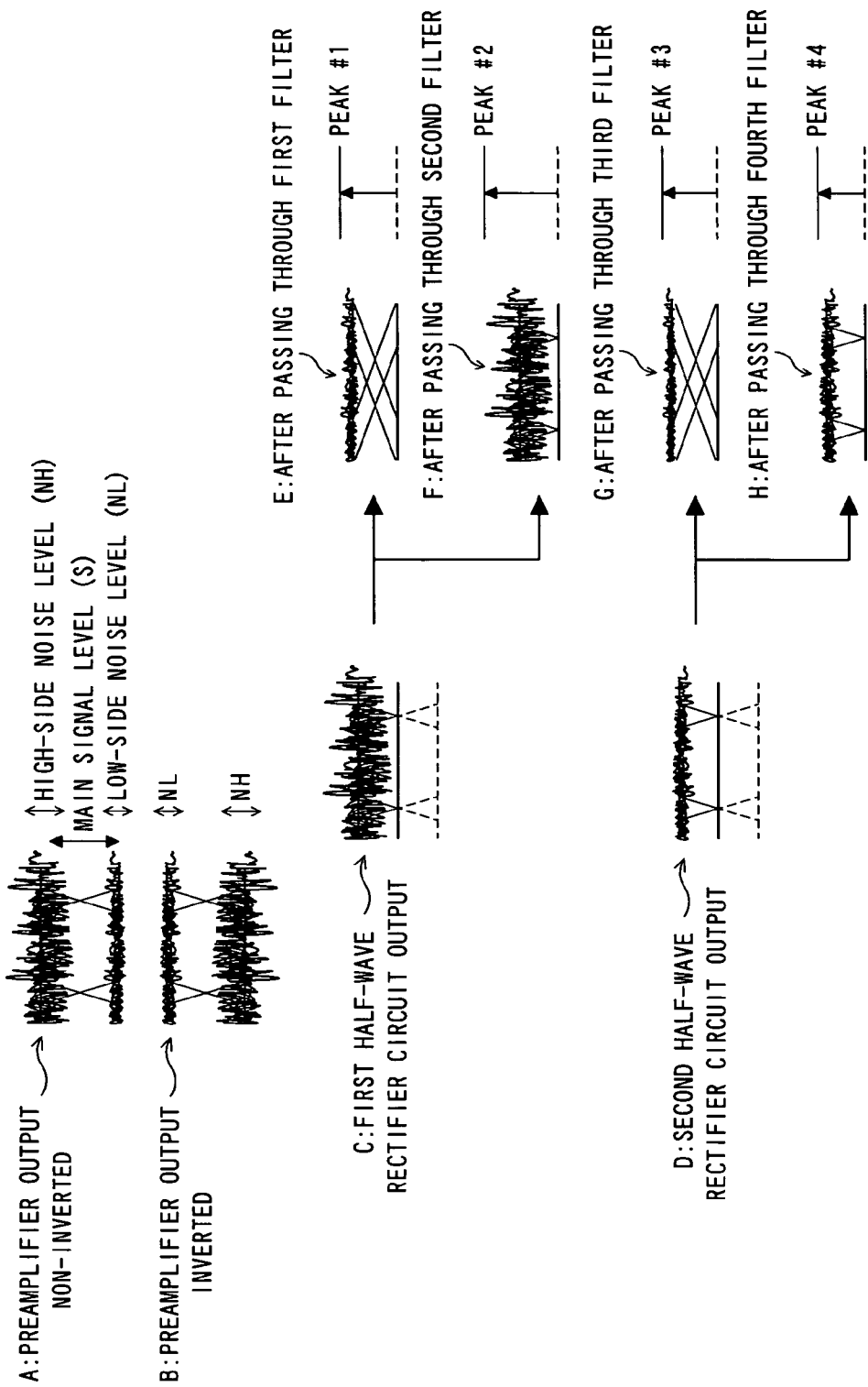
FIGS. 2 through 6, and 8 are diagrams for illustrating functions of essential parts according to the first embodiment of this invention.

The preamplifier (amplifying unit) 2 converts the electric current signal from the light receiving element 1 into a voltage signal, and amplifying the voltage signal. Concretely, the preamplifier 2 amplifies the electric signal (voltage signal) having an intensity corresponding to a level of the signal light received by the light receiving element 1, and outputs a non-inverted signal (refer to A in FIG. 2) having a binary signal pattern of the main signal (modulated on the signal light by an optical transmitting apparatus not shown), and an inverted signal (refer to B in FIG. 2) having an inverted binary signal pattern, as the amplified voltage signals.

The light receiving element 1 and the preamplifier 2 described above together configure a light receiving unit for receiving signal light on which a binary signal forming a main signal has been modulated, and outputting an electric signal having an intensity corresponding to a level of the received signal light.

The discriminator 3 compares a level of the voltage signal (non-inverted signal, inverted signal) outputted from the preamplifier 2 with a discrimination level to regenerate data. The discrimination level used in the discriminator 3 is derived through an operation by the discrimination level operation controlling unit 5 to be described later, and set and controlled by the same.

The S/N monitoring unit (level detecting unit) 4 monitors the voltage signals from the preamplifier 2, and detects a plurality of level values, which are to be used as parameters to derive S/N of the received signal, from the voltage signals. Concretely, on the basis of the voltage signals from the preamplifier 2, the S/N monitoring unit 4 detects a high level and a low level of the binary signal modulated on the signal light, and peak levels of the electric signals containing noise generated at the time of transmission, on both the high side and the low side of the binary signal.

The discrimination level operation controlling unit 5 calculates a discrimination level to be used in the above-mentioned discriminator 3 by using a high level and a low level of the binary signal modulated on the signal light, and levels of noise signals contained in the high side and the low side of the binary signal detected by the S/N monitoring unit 4, and sets the discrimination level in the discriminator 3.

As shown in FIG. 1, the above-mentioned S/N monitoring unit 4 comprises capacitor elements 4a and 4b, first and second half-wave rectifier circuits 4c and 4d, first to fourth filters 4e to 4h, and first to fourth peak detecting units 4i to 4l. The first half-wave rectifier circuit 4c is inputted the non-inverted signal from the preamplifier 2 through the capacitor element 4a for removing the direct current, half-wave-rectifies the non-inverted signal, and outputs a high-level signal (refer to C in FIG. 2) of the binary signal modulated on the signal light. Similarly, the second half-wave rectifier circuit 4d is inputted the inverted signal from the preamplifier 2 through the capacitor element 4b for removing the direct current, half-wave-rectifies the inverted signal, and outputs a low-level signal (refer to D in FIG. 2) of the binary signal modulated on the signal light (while removing the noise therein).

The first filter 4e is inputted the high-level signal from the first half-wave rectifier circuit 4c, and performs a filtering process on the high-level signal by means of a low-pass filter having such a characteristic that a transmission band thereof is set to one-half or less of a frequency band of the main signal. As this, the first filter 4e can transmit a signal level (refer to E in FIG. 2) in a signal section in which at least two "1"s succeed like "1,1" in the code of the main signal.

When an electric signal obtained from signal light on which main signal data of 10 Gb/s has been modulated is inputted, for example, the first filter 4e can be a low-pass filter whose cutoff frequency is about 2 GHz, for example. Incidentally, A in FIG. 3 denotes a filter characteristic of the first filter 4e configured with a low-pass filter whose cutoff frequency fc is about 2 GHz.

The second filter 4f is inputted the high-level signal from the first half-wave rectifier circuit 4c, and performs the filtering process on the high-level signal by means of a low-pass filter having such a characteristic that a transmission band thereof is set to the frequency band or less of the main signal. The second filter 4f can transmit only a signal containing noise components appearing in the vicinity of this high level contained in the high-level signal from the first half-wave rectifier circuit 4c (refer to F in FIG. 2).

The third filter 4g is inputted the low-level signal from the second half-wave rectifier circuit 4d like the first filter 4e, and performs the filtering process on the low-level signal by means of a low-pass filter having such a characteristic that a transmission band thereof is set to one-half or less of the frequency band of the main signal. The third filter 4g can transmit a signal level (refer to G in FIG. 2) in a signal section in which at least two "0"s succeed like "0,0" in the code of the main signal.

When an electric signal obtained from signal light on which main signal data of 10 Gb/s has been modulated is inputted, for example, the third filter 4g may be configured with a low-pass filter whose cutoff frequency is about 2 GHz, for example, like the first filter 4e.

The fourth filter 4h is inputted the low-level signal from the second half-wave rectifier circuit 4c, and performs the filtering process on the low-level signal by means of a low-pass filter having such a characteristic that a transmission band thereof is set to the frequency band or less of the main signal. The fourth filter 4h can transmit only a signal containing noise components appearing in the vicinity of this low level contained in the low-level signal from the second half-wave rectifier circuit 4c (refer to H in FIG. 2).

In the case of main signal data of 10 Gb/s, each of the second and fourth filters 4f and 4h may be configured with a low-pass filter whose cutoff frequency is about 6 GHz, for example. B in FIG. 3 denotes a filter characteristic of the second and fourth filters 4f and 4h each configured with a low-pass filter whose cutoff frequency fc is about 6 GHz.

The first peak detecting unit 4i detects a peak level (peak #1 in FIG. 2) of components transmitted through the first filter 4e, whereby the peak level detected by the peak detecting unit 4i can be taken out as a level of "1" (SH) of the main signal data. In other words, the first filter 4e and the first peak detecting unit 4i mentioned above together configure a high-level signal detecting unit for detecting a high-level of the binary signal modulated on the signal light on the basis of the output from the first half-wave rectifying circuit 4c.

The second peak detecting unit 4j detects a peak level (peak #2 in FIG. 2) of components transmitted through the second filter 4f, whereby the peak level detected by the peak detecting unit 4j can be detected as a level of the electric signal (SH+NH) containing noise on the "1"'s side of the main signal, as well as the above SH. In other words, the second filter 4f and the second peak detecting unit 4j mentioned above together configure a high-side noise peak detecting unit for detecting an electric signal level containing noise components contained in the high-side of the binary signal.

The third peak detecting unit 4k detects a peak level (peak #3 in FIG. 2) of components transmitted through the third filter 4g, whereby the peak level detected by the peak detecting unit 4k can be taken out as a level of "0" (SL) of the main signal data. In other words, the third filter 4g and the third peak detecting unit 4k mentioned above together configure a low-level signal detecting unit for detecting a low level of the binary signal modulated on the signal light on the basis of the output from the second half-wave rectifier circuit 4d.

The forth peak detecting unit 4l detects a peak level (peak #4 in FIG. 2) of components transmitted through the fourth filter 4h, whereby the peak level detected by the peak detecting unit 4l can be detected as a level of an electric signal (SL+NL) containing noise (NL) on the "0"'s side of the main signal, as well as the above SL. In other words, the fourth filter 4h and the fourth peak detecting unit 4l mentioned above together configure a low-side noise peak detecting unit for detecting an electric signal level containing noise components contained in the low side of the binary signal.

The peaks #1 and #3 of signals transmitted through the low-pass filters configuring the first and third filters 4e and 4g are detected by the first and third peak detecting units 4i and 4k, whereby peak values of "1" and "0" of the main signal data can be taken out from the detected peaks #1 and #3 irrespective of whether the received signal is in the minimum receiving system or the maximum receiving system described above.

Figure 5:
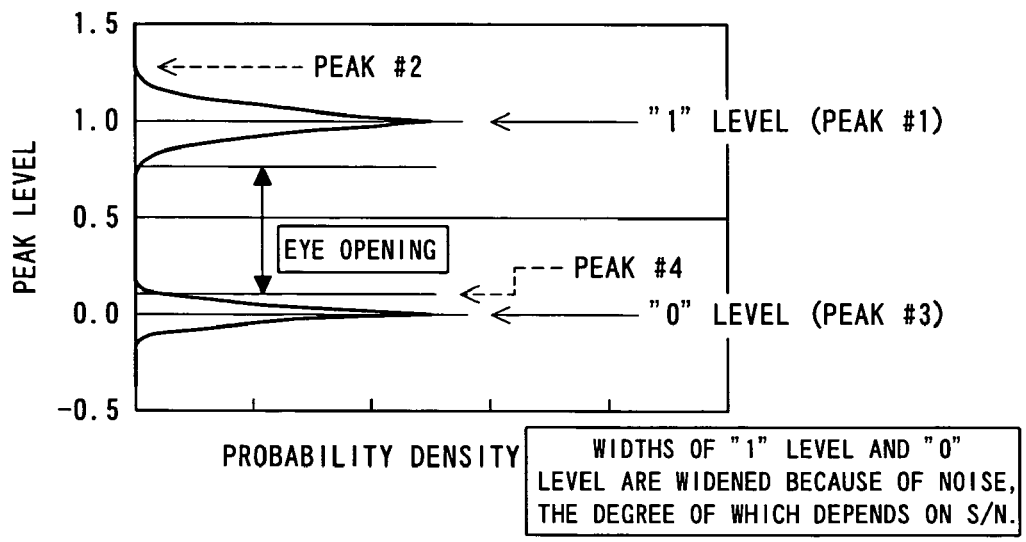

FIG. 5 is a diagram showing an example of probability distribution of the electric signal levels containing noise transmitted through the second and fourth filters 4f and 4h. In FIG. 5, the level of "0" of the main signal is normalized to "0.0," whereas the level of "1" of the main signal is normalized to "1.0," and distribution of the levels along the y axis that the electric signals transmitted through the second and fourth filters 4f and 4h can have is shown as probability distribution.

As shown in FIG. 5, the electric signal levels (peak values) transmitted through the second and fourth filters 4f and 4h have normal distribution centered at "0" and "1" of the main signal, respectively. Incidentally, the peak #1 detected by the first peak detecting unit 4i corresponds to a level of "1" of the main signal in FIG. 5. The peak #2 detected by the second peak detecting unit 4j corresponds to a level on the foot of the peak on the higher peak value's side of the normal distribution of "1" of the main signal in FIG. 5. The peak #3 detected by the third peak detecting unit 4k practically corresponds to a level of "0" of the main signal in FIG. 5. The peak #4 detected by the fourth peak detecting unit 4l practically corresponds to a level on the foot of the peak on the higher peak value's side of the normal distribution of "0" of the main signal in FIG. 5.

Figure 6:
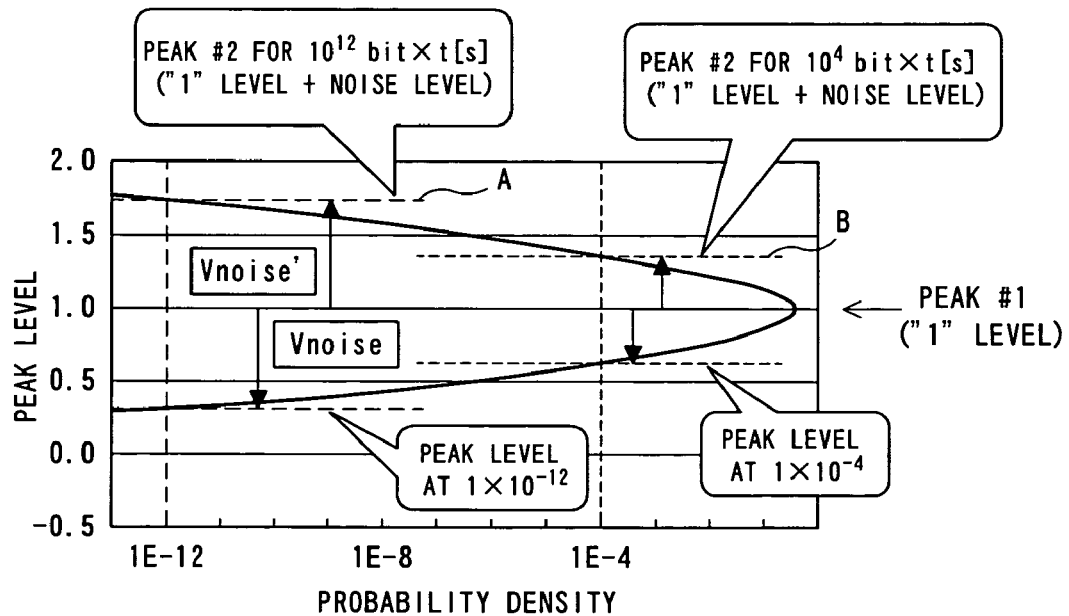

As to the probability distribution of the peak values shown in FIG. 5, the longer the measuring time, the wider the foot (width of the peak value) of the waveform forming the normal distribution. Assuming here that a time interval in which one error occurs is used as a reference for setting the measuring time, for example. When the measuring time is set at a level of BER=$1\times10^{-12}$, that is, one error occurs for $1\times10^{12}$ bits, a level A (Vnoise) is located at the foot of the normal distribution, as shown in FIG. 6, for example. When the measuring time is set at a level of BER=$1\times10^{-4}$, that is, one error occurs for $1\times10^{4}$ bits, a level B shown in FIG. 6 is located at the foot of the normal distribution.

Accordingly, the obtained peaks #2 and #4 in the second and fourth peak detecting unit 4j and 4l are fluctuated depending on the measuring time of the electric signal levels for detecting the peak values. The fluctuation in the peaks #2 and #4 affects on BER that is guaranteed for the data regenerated by the discriminator 3.

Figure 7:
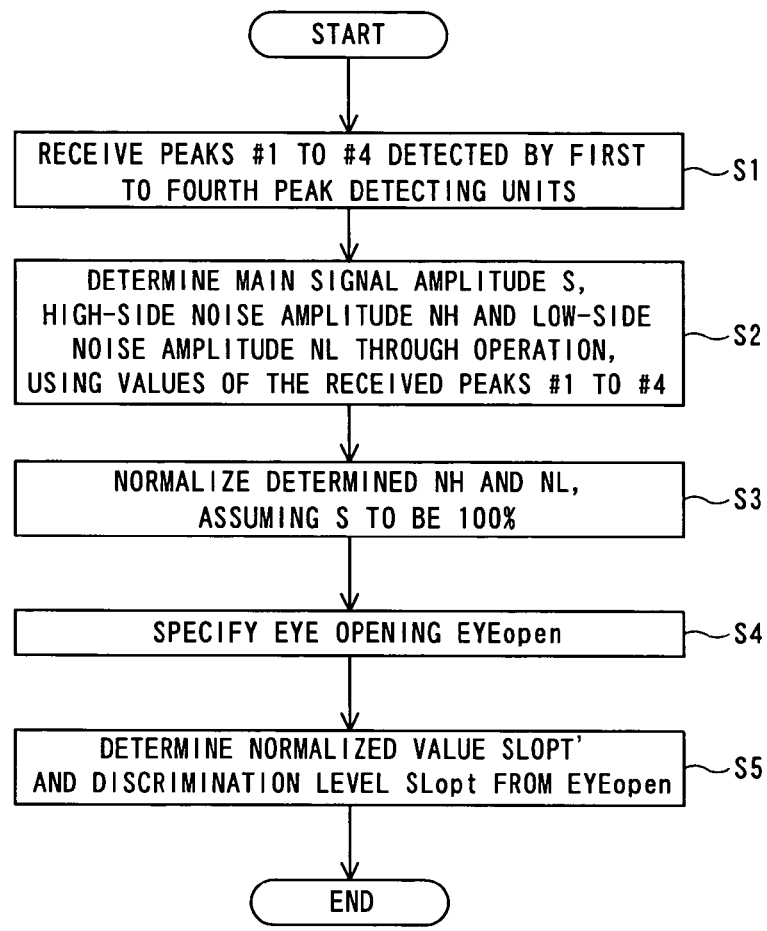
FIG. 7 is a flowchart for illustrating a process in a discrimination level operation controlling unit according to the first embodiment of this invention.

The discrimination level operation controlling unit 5 uses the high level and the low level of the binary signal modulated on the signal light detected by the first and third peak detecting units 4i and 4k of the S/N monitoring unit 4, and the peak levels of the electric signals containing noise on the high-side and the low-side of the binary signal detected by the second and fourth peak detecting units 4j and 4l of the S/N monitoring unit 4 to calculate a discrimination level as shown in FIG. 7, for example, and sets the calculated discrimination level to the discriminator 3.

The discrimination level operation controlling unit 5 determines a main signal amplitude S (refer to FIG. 2) from the peaks #1 and #3 detected by the first and third peak detecting units 4i and 4k according to an equation (1), determines a noise amplitude NH (refer to FIG. 2) on the high side from the peaks #1 and #2 detected by the first and second peak detecting units 4i and 4j according to an equation (2), and determines a noise amplitude NL (refer to FIG. 2) on the low side from the peaks #3 and #4 detected by the third and fourth peak detecting units 4k and 4l, by using an equation (3) (steps S1 and S2).

$$S=(\text{peak }\#1)+(\text{peak }\#3) \quad (1)$$

$$NH=2*\{(\text{peak }\#2)-(\text{peak }\#1)\} \quad (2)$$

$$NL=2*\{(\text{peak }\#4)-(\text{peak }\#3)\} \quad (3)$$

Figure 4:
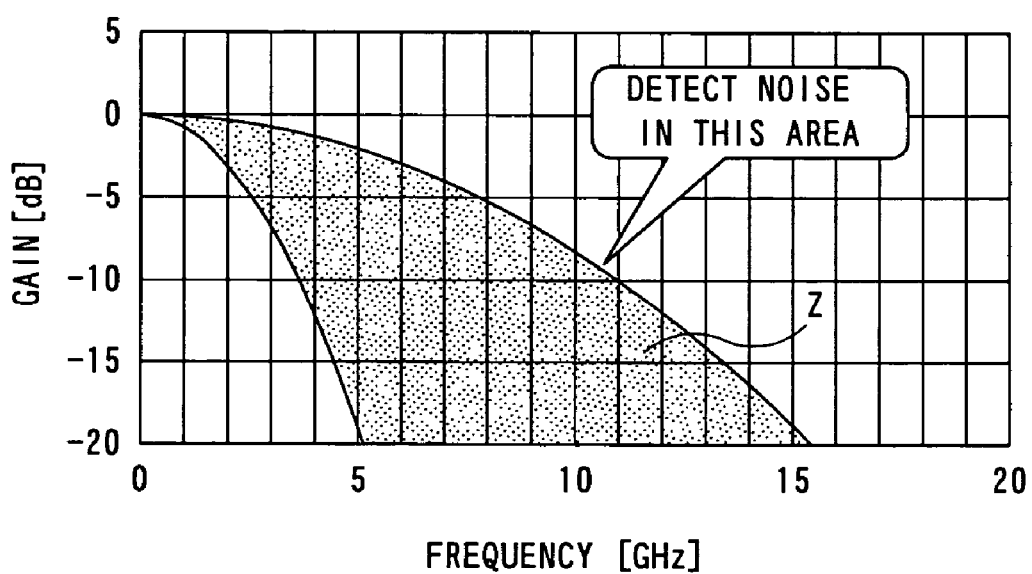

The high-side noise whose amplitude is determined as above corresponds to electric signal components in an area Z (that is, a difference area Z between a transmission area of the second filter 4*f* and a transmission area of the first filter 4*e*) not transmitted through the first filter 4*e* of an electric signal transmitted through the second filter 4*f*, as shown in FIG. 4, for example. Similarly, the low-side noise corresponds to electric signal components in an area not transmitted through the third filter 4*g* of an electric signal transmitted through the fourth filter 4*h*.

In order to cancel fluctuations in the obtained S, NH and NL due to the amplitude values, normalized values S', NH' and NL' are obtained as expressed by equations (1') through (3') for the respective values S, NH and HL, assuming the signal amplitude S to be 100 percent (step S3).

$$S'=1 \text{ (that is, 100 percent)} \quad (1')$$

$$NH'=NH/S \quad (2')$$

$$NL'=NL/S \quad (3')$$

Figure 3:
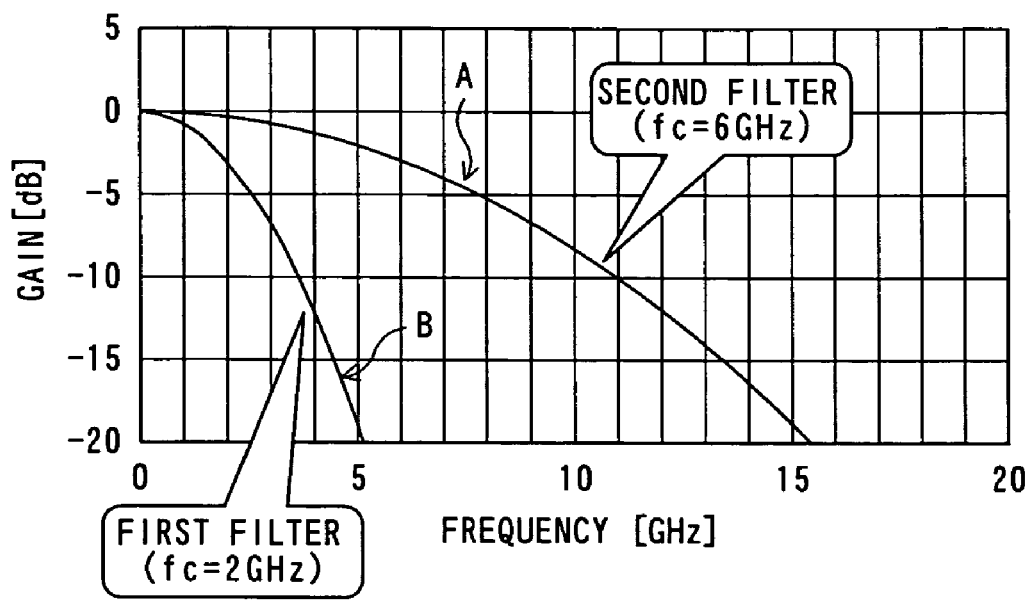
Figure 8:
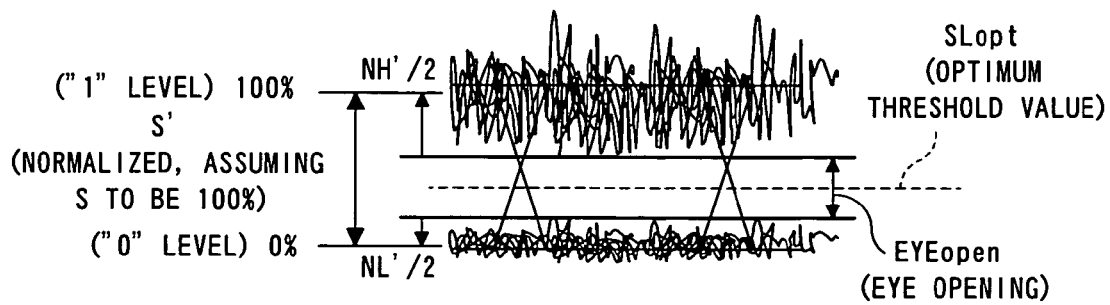

As shown in FIG. 3 or 8, a level area obtained by removing levels of the noise signals NH' and NL' contained in the high side and the low side from a level area S' between the high level and the low level of the binary signal modulated on the signal light is specified as an eye opening EYEopen (step S4). Since EYEopen corresponds to an area obtained by removing the lower half (NH'/2) of the high-side noise amplitude and the upper half (NL'/s) of the low-side noise amplitude from the signal level S', EYEopen can be expressed by an equation (4):

$$EYE\text{open}=1-(NH'/2+NL'/2) \quad (4)$$

When the discrimination level SLopt to be calculated is defined to be located at the center of the above-mentioned eye opening, the SLopt is a level obtained by adding one-half of the EYEopen to the upper half (NL'/2) of the low-side noise amplitude, thus can be given by the following equation (5):

$$SL\text{opt}'=(\tfrac{1}{2})*(1-NH'/2+NL'/2) \quad (5)$$

By using the SLopt' calculated as above, the discrimination level operation controlling unit 5 can set the discrimination level SLopt=S*SLopt' to the discriminator 3 (step S5).

In the first embodiment, separately provided are the first filter 4*e* and the first peak detecting unit 4*i* configuring the high-level signal detecting unit, and the third filter 4*g* and the third peak detecting unit 4*k* configuring the low-level signal detecting unit. Alternatively, according to this invention, a unit for detecting either the high-level signal or the low-level signal may be provided, and a function as being the discrimination level operation controlling unit may double the detected signal level value to yield a value equivalent to the signal level determined through the equation (1).

The detection time setting unit 6 shown in FIG. 1 sets a time for which the first to fourth peak detecting units 4*i* to 4*l* detect the peak levels. As described above, values of the peaks fluctuate depending on the peak value detection time in the second and fourth peak detecting units 4*j* and 4*l*, that is, a time for which the peak values are measured. In the first embodiment, a time for which the peak values are measured is set by the detection time setting unit 6 according to a value of BER that a signal whose data is regenerated by the discriminator 3 is required Concretely, the detection time setting unit 6 gives a reset signal for the peak detecting process to the first to fourth peak detecting units 4*i* to 4*l* at time intervals set according to a value of BER and a bit rate of the signal.

For example, when BER of $1\times10^{-12}$ is required at the time of data regeneration in the discriminator 3, a time of $10^{12}$ bit×T (T being a one bit time) is set as a time for detecting the peak value. A signal having a bit rate of 10 Gb/s has T=100 ps, thus the detection time setting unit 6 sets a time of 100 s as the peak value measuring time. Namely, the detection time setting unit 6 outputs the reset signal at time intervals of 100 s to the first to fourth peak detecting units 4*i* to 4*l*.

When BER of $1\times10^{-4}$ is required at the time of data regeneration in the discriminator 3, a time of $10^4$ bit×T (T being one bit time) is set as the time for which the peak value is measured. When a signal has a bit rate of 10 Gb/s, the detection time setting unit 6 sets a time of $1\times10^{-6}$ s=1 μS as the peak value measuring time. Namely, the detection time setting unit 6 outputs the reset signal to the first to fourth peak value detecting units 4*i* to 4*l* at time intervals of 1 μs.

Accordingly, the first to fourth peak detecting units 4*i* to 4*l* can detect peak values of signals transmitted through the first to fourth filters 4*e* to 4*h* at the reset signal intervals inputted from the detection time setting unit 6.

The discrimination level operation controlling unit 5 according to the first embodiment calculates the discrimination level each time the peaks #1 to #4 outputted for every peak value measuring time set by the detection time setting unit 6 are obtained. Alternatively, according to this invention, it is possible to calculate an average value of plural values of each of the peaks #1 to #4 outputted for every measuring time, and operate the discrimination level by using the peak values #1 to #4 undergone the averaging process.

When the averaging process is performed 10 to 100 times, the reliability of obtained peaks #1 to #4 is more improved than when the discrimination level is calculated for every peak value measuring time, although the cycle of the operation of the discriminating level increases 10 to 100 times. Thus, it becomes possible to calculate the discrimination level more accurately agreeing with the specified BER, and set it in the discriminator 3.

The discrimination level operation controlling unit 5 and the detection time setting unit 6 can be configured with firmware or the like. In which case, the discrimination level operation controlling unit 5 performs the arithmetic processing with digital signals. Accordingly, when the outputs from the peak detecting units 4*i* to 4*l* and the signal of the discrimination level inputted to the discriminator 3 are analog signals, an analog/digital converter is suitably disposed between the first to fourth peak detecting units 4*i* to 4*l* and the discrimination level operation controlling unit 5, and a digital/analog converter is suitably interposed between the discrimination level operation controlling unit 5 and the discriminator 3.

In the signal light processing apparatus 10 structured as above, the S/N monitoring unit 4 can detect the high level ("1" level) and the low level ("0" level) of binary signal components modulated on an electric signal from the preamplifier 2, and detect, with high accuracy, peak levels of the electric signal on both the high side and the low side of the binary signal, which allows to obtain the most suitable discrimination level not affected by the noise from these peak levels and the "1" and "0" levels through simple operations.

Since the detection time setting unit 6 can vary the time of peak detection in the first to fourth peak detecting units 4*i* to 4*l*, it becomes possible to readily determine the discrimination level suited to the specified BER required when the discriminator 3 regenerates the data, regardless of whether the signal light processing apparatus is in the minimum receiving system or the maximum receiving system.

As above, in the signal light processing apparatus 10 according to the first embodiment of this invention, the S/N monitoring unit 4 detects the high level and the low level of binary signal components from electric signals from the preamplifier 2, and detects peak levels of the electric signals on both the high side and the low side of the binary signal. It is thus possible to determine an amplitude value of the practical data components of the photoelectric-converted electric signals and an amplitude value of the noise practically contained in the electric signals by using each of the levels detected as above, thereby to readily determine, from these amplitude values, the discrimination level at which the effect of the noise is most suitable under conditions of the specified BER.

Further, the discriminator 3 can determine the discrimination level practically based on S/N of the received signal light, without interposing the FEC function. Whereby, it becomes possible that the apparatus can be easily faced to an apparatus without a corresponding FEC encoding/decoding function, and avoid an increase in size of the apparatus as being an optical module.

[B] Description of Second Embodiment

Figure 9:
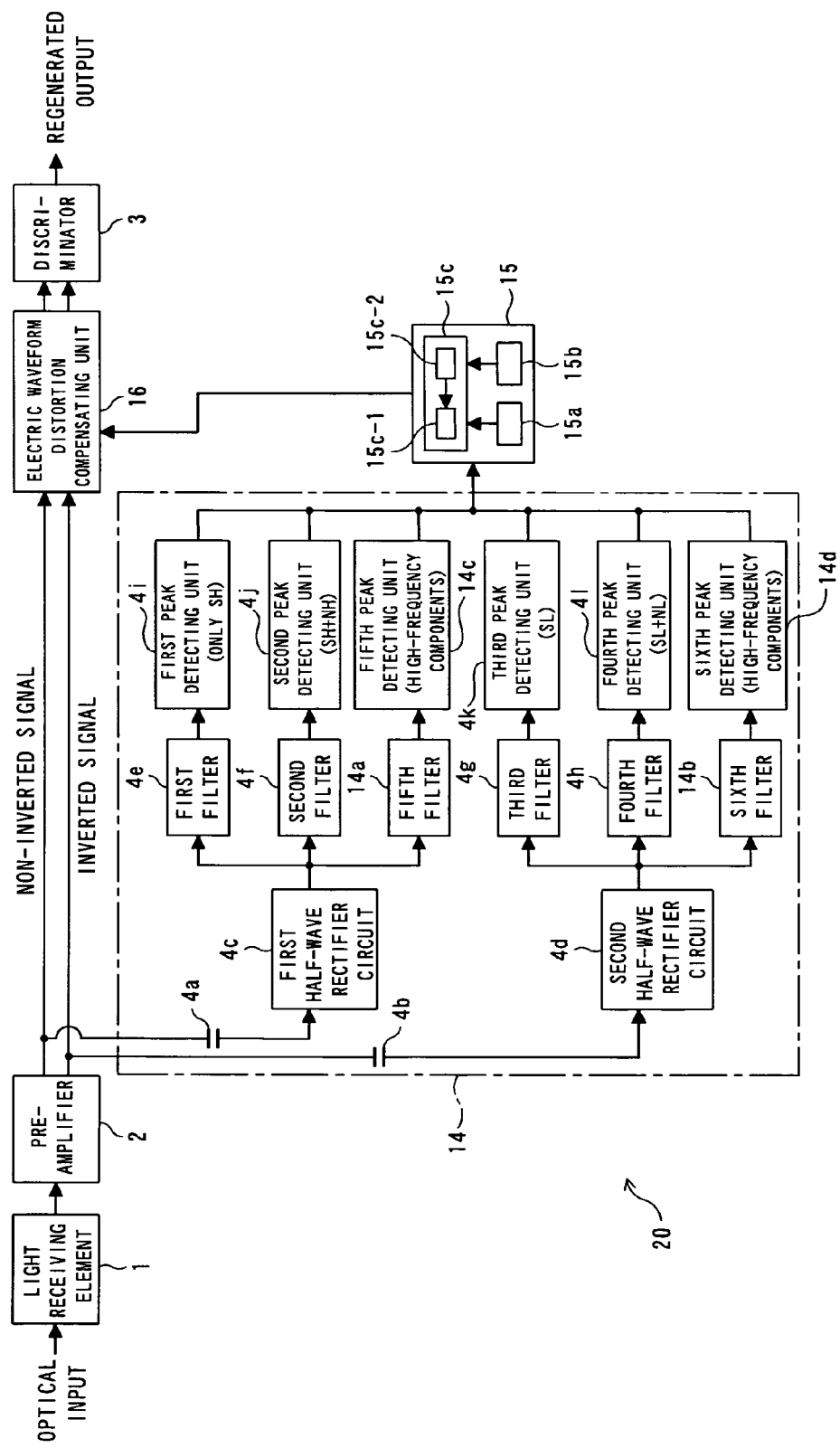
FIG. 9 is a block diagram showing a signal light processing apparatus according to a second embodiment of this invention.

FIG. 9 is a block diagram showing a signal light processing apparatus 20 according to a second embodiment of this invention. The signal light processing apparatus 20 shown in FIG. 9 can be applied as an optical receiving apparatus in an optical communication system like the first embodiment. Unlike the above-described first embodiment, the signal light processing apparatus 20 has a structure for detecting waveform distortion components due to wavelength dispersion of signal light transmitted through a transmission path. In FIG. 9, like reference characters designate like or corresponding parts in FIG. 1.

The signal light processing apparatus 20 has the light receiving element 1, the preamplifier 2 and the discriminator 3, like the first embodiment. Unlike the above-described first embodiment, the signal light processing apparatus 20 further has a transmission waveform distortion monitoring unit 14, a transmission waveform distortion compensation amount operation controlling unit 15, and an electric waveform distortion compensating unit 16 between the preamplifier 2 and the discriminator 3, thereby being able to compensate waveform distortion of the received signal light.

The electric waveform distortion compensating unit 16 is controlled by the transmission waveform distortion compensation amount operation controlling unit 15 to compensate waveform distortion components contained in electric signals from the preamplifier 2 with an electric amount, and outputs electric signals in which the waveform distortion components have been compensated to the discriminator 3. The electric waveform distortion compensation unit 16 is a first waveform distortion compensating unit.

The transmission waveform distortion monitoring unit 14 has the capacitor elements 4a and 4b, the first and second half-wave rectifier circuits 4c and 4d, the first to fourth filters 4e to 4h and the first to fourth peak detecting unit 4i to 4l in the S/N monitoring unit 4, like the above-described first embodiment. Unlike the first embodiment, the transmission waveform distortion monitoring unit 14 further has a fifth and sixth filters 14a and 14b, and a fifth and sixth peak detecting unit 14c and 14d.

The fifth filter 14a is a band-pass filter which transmits a high-frequency band centered at the frequency band of the main signal in the output from the first half-wave rectifier circuit 4c as the transmission band. Concretely, when the band of the main signal is 10 Gb/s, the fifth filter 14a is configured with a band-pass filter having a transmission band centered at the 10 GHz band, as denoted by C in FIG. 10, for example.

The sixth filter 14b is a band-pass filter which transmits a high-frequency band centered at a frequency band of the main signal in the output from the second half-wave rectifier circuit 4d as a transmission band. In this case, when the band of the main signal is 10 Gb/s, for example, the sixth filter 14b is configured with a band-pass filter having a transmission band centered at a 10 GHz band as denoted by C in FIG. 10, like the fifth filter 14a.

Figure 10:
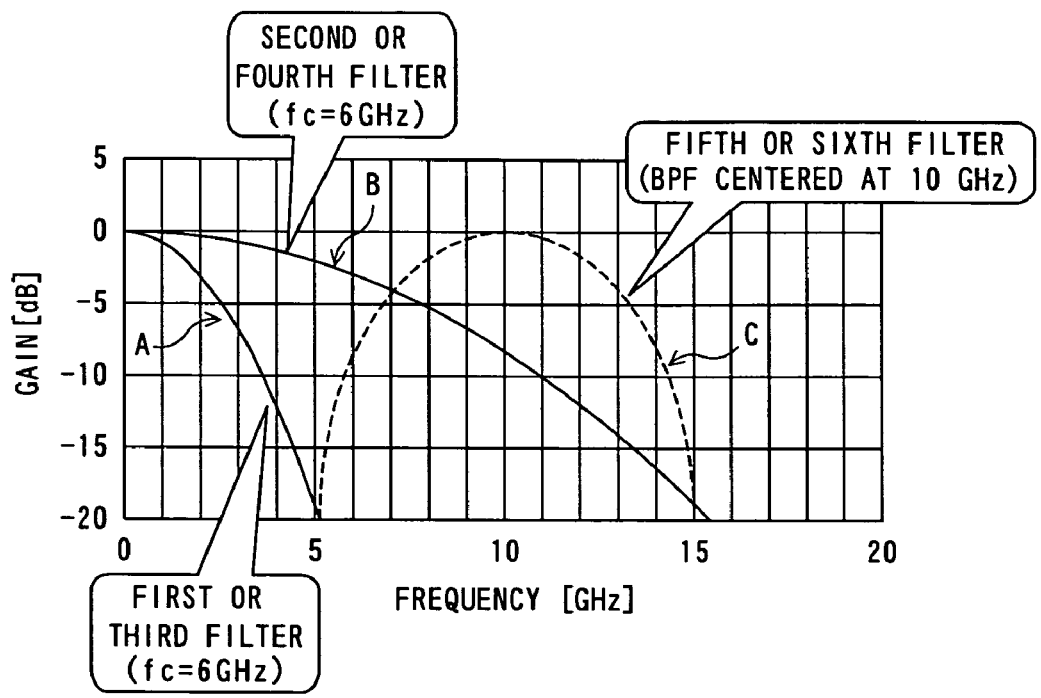
FIGS. 10, 11(a), 11(b), 12 and 13 are diagrams for illustrating functions of essential parts according to the second embodiment of this invention.

A in FIG. 10 denotes a filter characteristic of the first and third filter 4e and 4g having a structure similar to that according to the first embodiment described above. B in FIG. 10 denotes a filter characteristic of the second and fourth filter 4f and 4h having a structure similar to that according to the first embodiment described above.

Figure 11A:
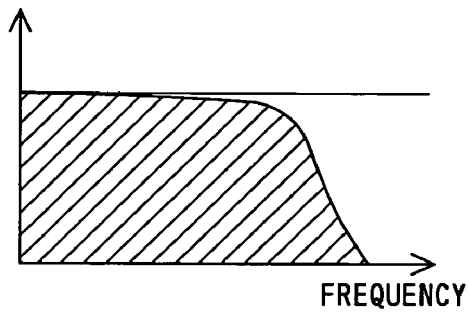
Figure 11B:
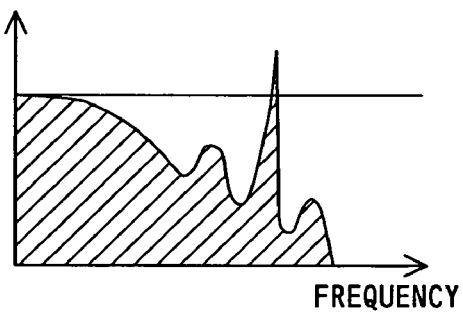

FIG. 11(a) is a diagram showing a frequency spectrum of transmitted signal light (on the transmitter's side) before the signal light is transmitted. FIG. 11(b) is a diagram showing a frequency spectrum of the received signal light (on the receiver's side) undergone signal waveform distortion after the corresponding signal light is transmitted. As shown in FIGS. 11(a) and 11(b), or 19(a) through 19(c), distortion of the transmission-deteriorated waveform appears as a change amount in high frequency components. Accordingly, the transmission-deteriorated components can be derived by taking out components transmitted through band-pass filters, which take out the high-frequency components like the above fifth and sixth filters 14a and 14b.

The fifth peak detecting unit 14c detects a peak level (peak #5) of components transmitted through the fifth filter 14a. The fifth filter 14a and the fifth peak detecting unit 14c together configure a high-side high-frequency level detecting unit for detecting a level of high frequency components contained in the high-side of the electric signal from the preamplifier 2.

The sixth peak detecting unit 14d detects a peak level (peak #6) in components transmitted through the sixth filter 14b. The sixth filter 14b and the sixth peak detecting unit 14d together configure a low-side high-frequency level detecting unit for detecting a level of high frequency components contained in the low-side of the electric signal from the preamplifier 2.

The fifth and sixth peak detecting units 14c and 14d detect the peaks #5 and #6 of the high frequency components, which are peak values, transmitted through the fifth and sixth filters 14a and 14b, respectively. The high frequency components transmitted through the fifth and sixth filters 14a and 14b contain elements of noise components (NH, NL) in addition to elements of distortion components of the transmission-deteriorated waveform mentioned above. Accordingly, the values of the peaks #5 and #6 obtained by the fifth and sixth peak detecting units 14c and 14d contain elements of the noise components in addition to elements of the distortion components of the transmission-deteriorated waveform mentioned above.

Figure 12:
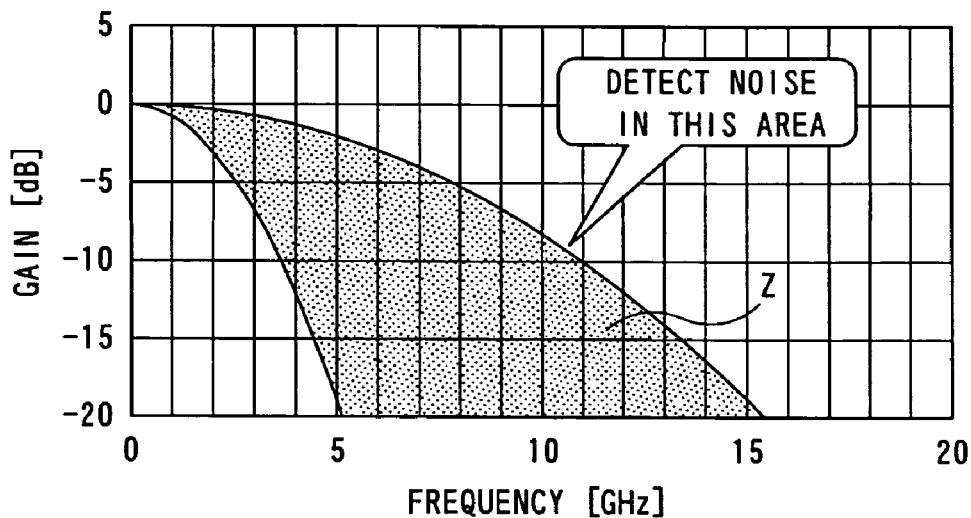
Figure 13:
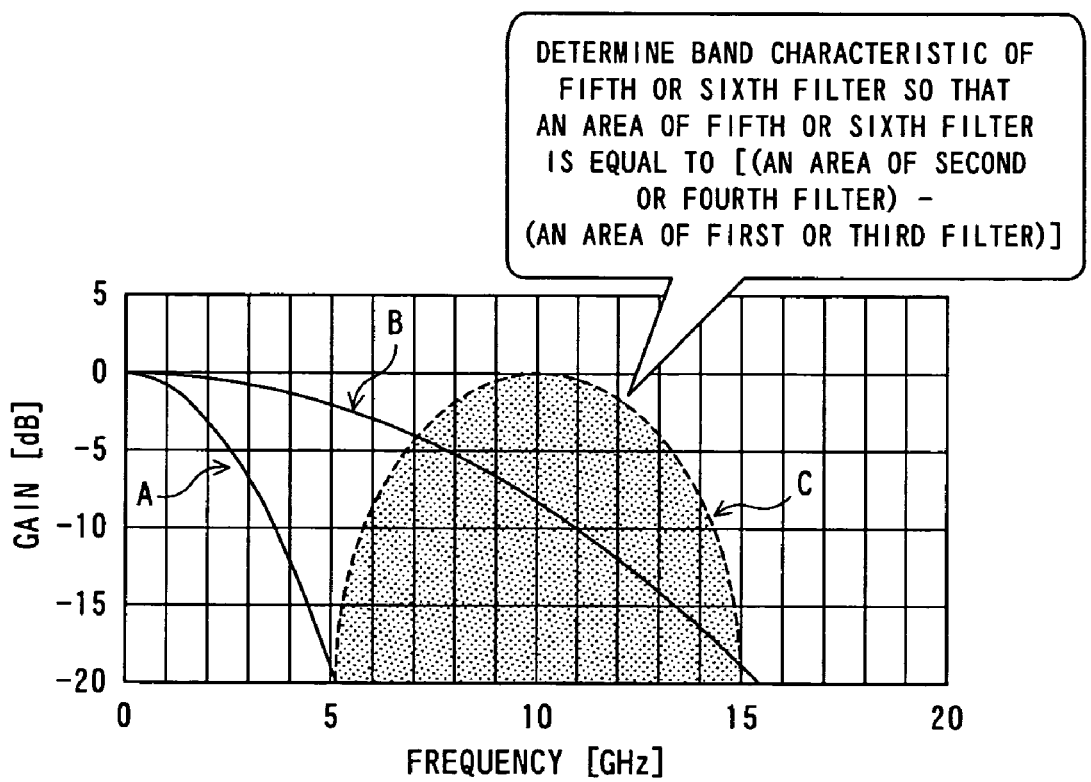

Setting of the Q value in each of the fifth and sixth filters 14a and 14b is performed in the following manner. As shown in FIG. 13, an area of the fifth/sixth filter 14a/14b is equal to {(area of the second/fourth filter 4f/4h)−(area of the first/third filter 4e/4g)}, that is, an area of the fifth/six filter 14a/14b is equal to an area of an area Z in FIG. 12, whereby the transmission path distortion compensation amount operation controlling unit 15 can efficiently get rid of the noise components contained in the peaks #5 and #6.

The transmission path distortion compensation amount operation controlling unit 15 comprises a high-side waveform distortion deriving unit 15*a*, a low-side waveform distortion deriving unit 15*b* and a compensation amount determination controlling unit 15*c*. The high-side waveform distortion deriving unit 15*a* subtracts a level of high-side noise components from a level (peak #5) of high-frequency components detected by the fifth peak detecting unit 14*c* configuring the high-side high-frequency level detecting unit to determine waveform distortion components DH contained in the high-side of the binary signal as a transmission deterioration amount, as given by an operational expression (6) below, for example. Further, the high-side waveform distortion deriving unit 15*b* normalizes the waveform distortion components DH, assuming an amplitude S of the main signal to be 100 percent. A value of S is determined by using the above equation (1).

A level of high-side noise components used when the waveform distortion components are derived by the high-side waveform distortion deriving unit 15*a* corresponds to a difference between a detection value (peak #2) fed from the second peak detecting unit 4*j* and a detection value (peak #1) fed from the first peak detecting unit 4*i*, thus being NH/2 [refer to equation (2)]. Namely, as shown in FIG. 12, this level corresponds to a level of a signal transmitted through the area Z obtained by removing the transmission area of the first filter 4*e* from the transmission area of the second filter 4*f*.

$$DH = (\text{peak \#5}) - \{(\text{peak \#2}) - (\text{peak \#1})\} \quad (6)$$
$$= (\text{peak \#5}) - NH/2$$
$$DH' = DH/S \quad (6')$$

In other words, the fifth filter 14*a* is made so that an area of the area Z is equal to an area of the fifth filter 14*a* configuring the high-side high-frequency level detecting unit as described, whereby a noise amount contained in a signal transmitted through the fifth filter 14*a* is equal to an amount of NH/2 determined from signals transmitted through the first and second filters 4*e* and 4*f*.

As above, the high-side waveform distortion deriving unit 15*a* can efficiently remove noise components contained in an output from the peak detecting unit 14*c* through an operation using the peak #1 and #2, which are detection values from the first and second peak detecting units 4*i* and 4*j*, thereby cutting out only high-frequency components, which form the waveform distortion components.

The low-side waveform distortion deriving unit 15*b* subtracts a level of high-side noise components from a level (peak #6) of high-frequency components detected by the sixth peak detecting unit 14*d* configuring the low-side high-frequency level detecting unit by using an operational expression of an equation (7) below, for example, to determine waveform distortion components DL contained in the low side of the binary signal as a transmission deterioration amount, and normalizes the waveform distortion components DL, assuming an amplitude of the main signal to be 100 percent, as expressed by an equation (7').

A level of the low-side noise components used when the waveform distortion components are derived by the low-side waveform distortion deriving unit 15*b* corresponds to a difference between a detection value (peak #4) fed from the fourth peak detecting unit 4*l* and a detection value (peak #3) fed from the third peak detecting unit 4*k*, thus being NL/2 [refer to equation (3)]. Namely, as shown in FIG. 12, the level of the low-side noise components corresponds to a level of a signal transmitted through an area Z obtained by removing a transmission area of the third filter 4*g* from a transmission area of the fourth filter 4*h*.

$$DL = (\text{peak \#6}) - \{(\text{peak \#4}) - (\text{peak \#3})\} \quad (7)$$
$$= (\text{peak \#6}) - NL/2$$
$$DL' = DL/S \quad (7')$$

In other words, as described above, the sixth filter 14*b* is made so that an area of the area Z is equal to an area of the sixth filter 14*b* configuring the high-side high-frequency level detecting unit, whereby a noise amount contained in a signal transmitted through the sixth filter 14*a* is equal to an amount of NL/2 determined from signals transmitted through the first and second filters 4*g* and 4*h*.

As above, the low-side waveform distortion deriving unit 15*b* can efficiently remove the noise components contained in an output from the sixth peak detecting unit 14*d* through an operation using the peaks #3 and #4, which are detection values from the third and fourth detecting units 4*k* and 4*l*, and cut out only high-frequency components, which are waveform distortion components.

The compensation amount determination controlling unit 15*c* is a first waveform distortion compensation controlling unit which controls a compensation amount in the first waveform distortion compensating unit on the basis of the waveform distortion components derived by the high-side waveform distortion deriving unit 15*a* and the low-side distortion deriving unit 15*b*. Namely, the compensation amount determination controlling unit 15*c* is inputted the waveform distortion components from the high-side waveform distortion deriving unit 15*a* and the low-side waveform distortion deriving unit 15*b* to determine a compensation amount to be used in the electric waveform distortion compensating unit 16 from correlation of these components, and controls the electric waveform distortion compensating unit 16 on the basis of the determined compensation amount.

When the chirp in an optical transmitting unit in a transmitting-side apparatus connected to the signal light processing apparatus 20 through a transmission path is stable, the fiber dispersion amount can be estimated from DH' and DL', which are transmission deterioration amounts. When the fiber dispersion amount is once determined, it is possible to compensate the waveform deterioration by setting the dispersion compensation amount in the electric waveform distortion compensating unit 16.

The compensation amount determination controlling unit 15*c* may comprise a storing unit 15*c*-1 which stores in prior, in a form of a table, information on correlation between the waveform distortion components from the high-side waveform distortion deriving unit 15*a* and the low-side waveform distortion deriving unit 15*b*, and a compensation amount in the electric waveform distortion compensating unit 16, and a controlling unit 15*c*-2 which determines the compensation amount by referring to the above table when inputted the high-side and low-side waveform distortion components, and controls the electric waveform distortion compensating unit 16.

In the signal light processing apparatus 20 structured as above according to the second embodiment, the transmission waveform distortion monitoring unit 14 detects the high level ("1" level) and the low level ("0" level) configuring binary signal components modulated on electric signals from the preamplifier 2, detects, with high accuracy, peak levels of the electric signals on both the high side and the low side of the binary signal, and detects high-frequency components contained in the electric signals from the preamplifiers 2 separately on the high-level side and the low-level side.

The high-side waveform distortion deriving unit 15a and the low-side waveform distortion deriving unit 15b in the transmission waveform distortion compensation amount operation controlling unit 15 determine waveform distortion components on the high side and the low side from the detected peak levels, the "1" and "0" levels and high-frequency components through a simple operation using the equations (6), (6'), (7) and (7').

The compensation amount determination controlling unit 15c determines a distortion compensation amount to be used in the electric waveform distortion compensating unit 16 from correlation between the waveform distortion components simply operated by the high-side waveform distortion deriving unit 15a and the low-side waveform distortion deriving unit 15b, and controls the distortion compensation amount in the electric waveform distortion compensating unit 16.

In the signal light processing apparatus 20 according to the second embodiment of this invention, the transmission waveform distortion monitoring unit 14 can detect the high level ("1" level) and the low level ("0" level) forming binary signal components modulated on electric signals from the preamplifier 2, detect, with high accuracy, peak levels of the electric signals on both the high side and the low side of the binary signal, separately, and detect high-frequency components contained in the electric signals from the preamplifier 2 on the high-level side and the low-level side, separately. It is thus possible to determine a waveform distortion amount from the peak levels, the "1" and "0" levels and the high-frequency components detected as above through a simple operation.

The transmission waveform distortion compensation amount operation controlling unit 15 determines a distortion compensation amount in the electric waveform distortion compensating unit 16 from collection between the waveform distortion components operated simply by the high-side waveform distortion deriving unit 15a and the low-side waveform distortion deriving unit 15b, and controls the electric waveform distortion compensating unit 16. Whereby, it is possible to perform stably the dispersion compensation control suited to a transmission path length in an optical communication system on which the apparatus is mounted, without preparing a menu of dispersion compensating fibers.

Figure 14:
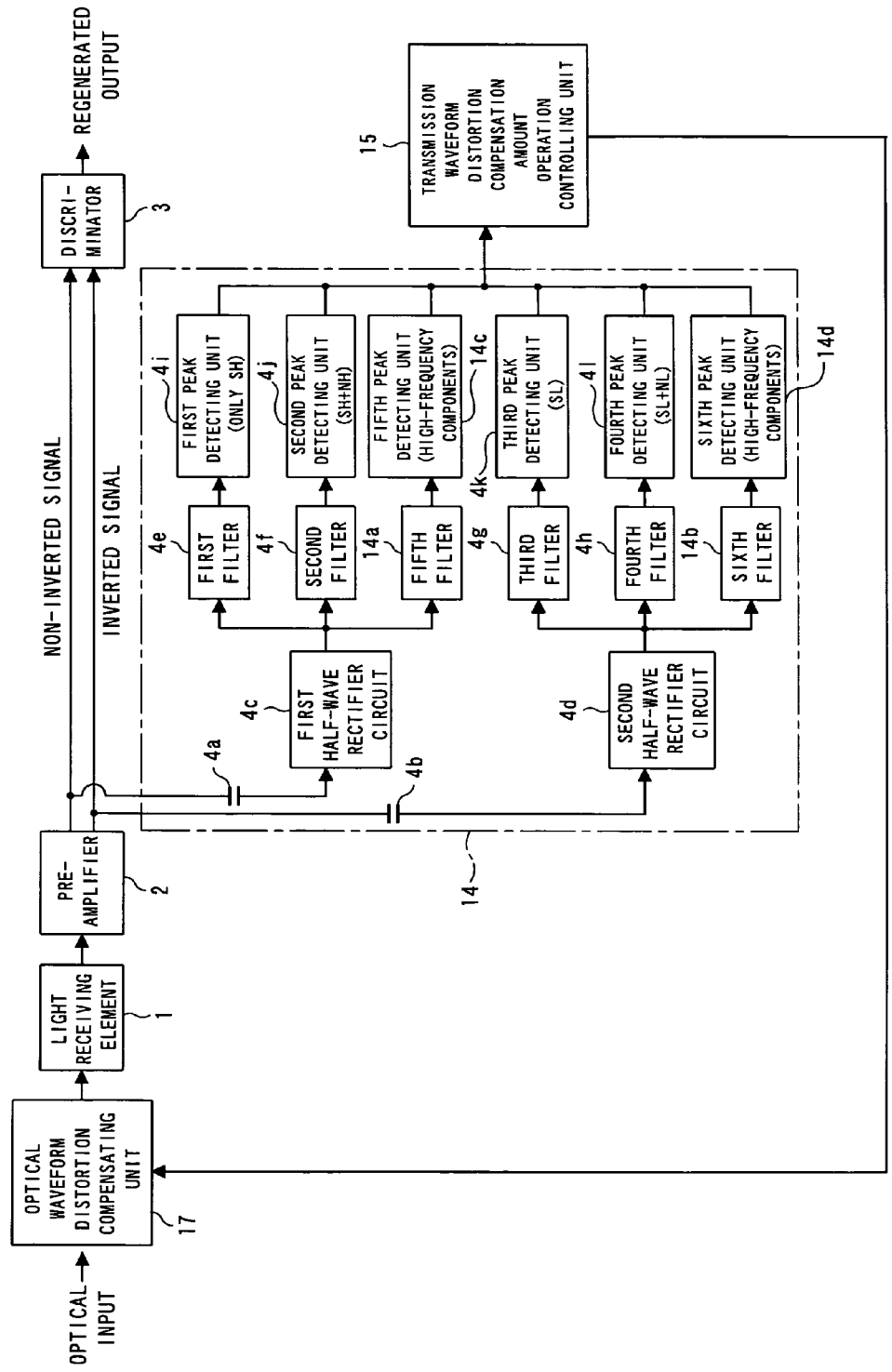
FIG. 14 is a block diagram showing a modification of the second embodiment of this invention.
Figure 15:
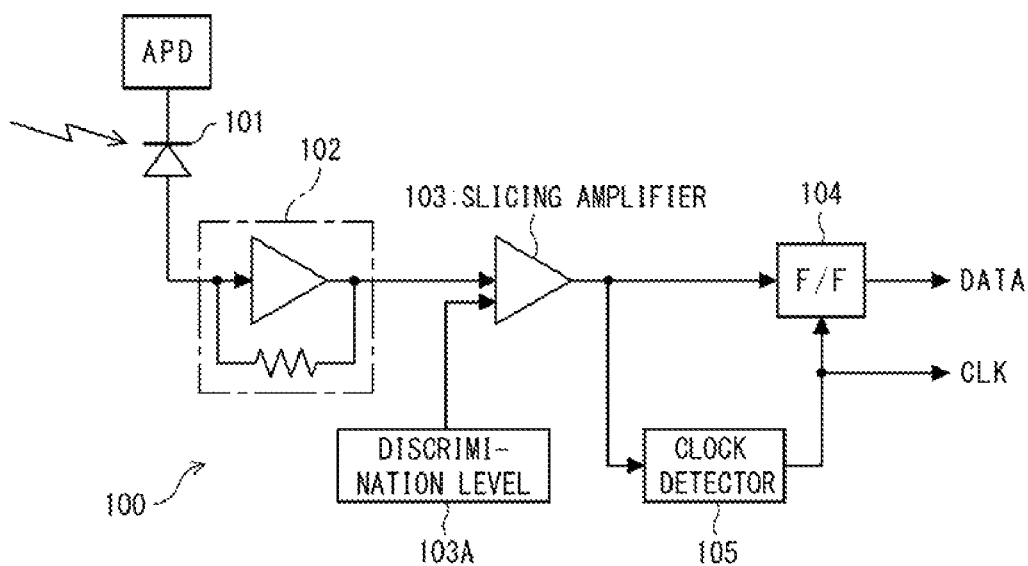
FIGS. 15 and 16 are block diagrams for illustrating known techniques.
Figure 16:
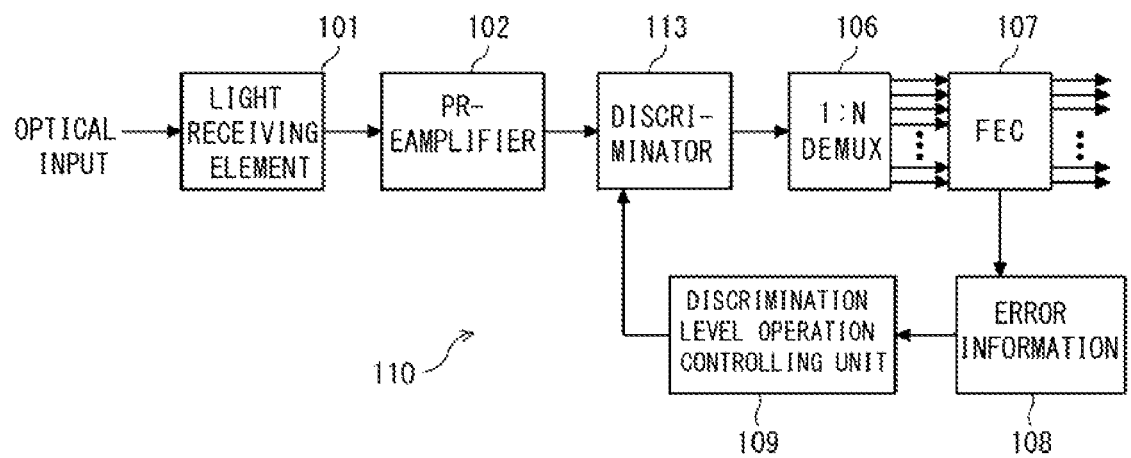
Figure 19A:
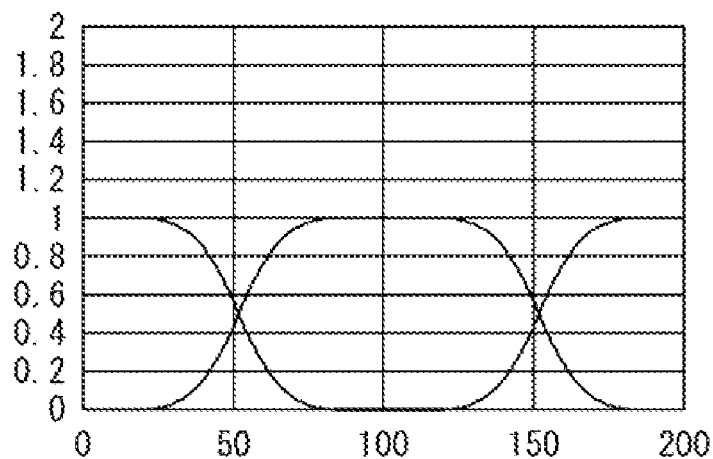
Figure 19B:
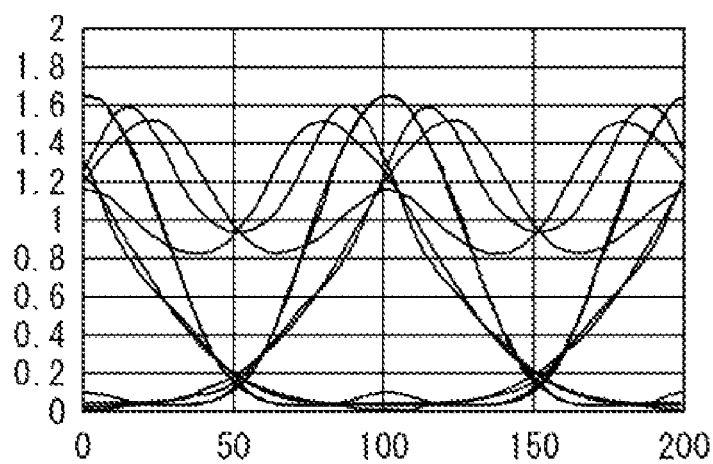
Figure 19C:
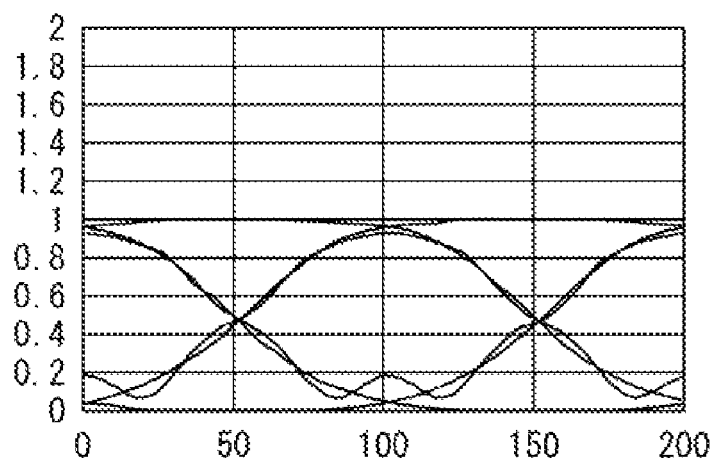
Figure 20A:
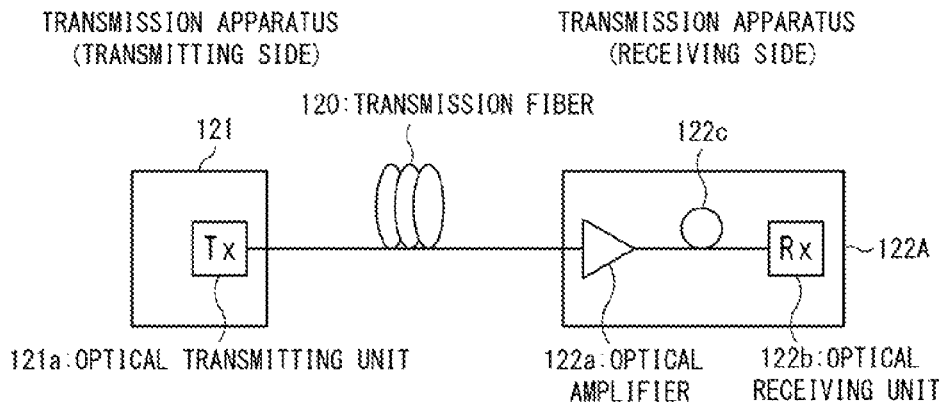
FIGS. 20(a) through 20(c) are diagrams for illustrating the known techniques.
Figure 20B:
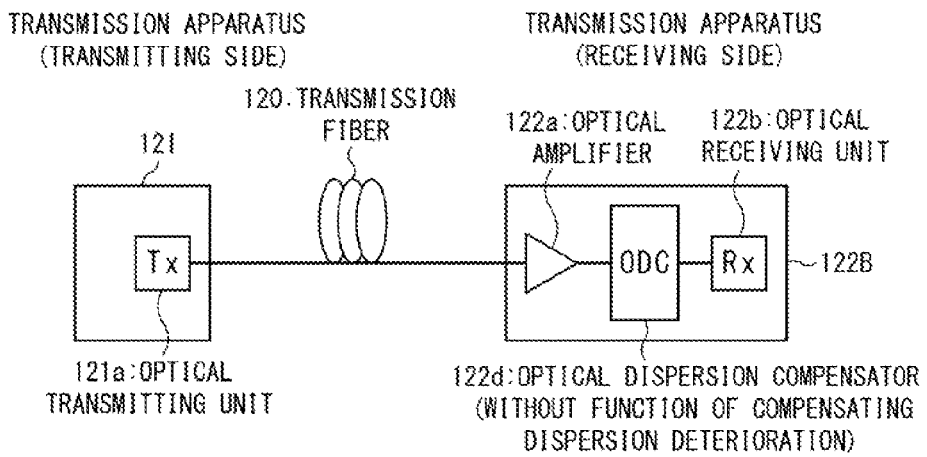
Figure 20C:
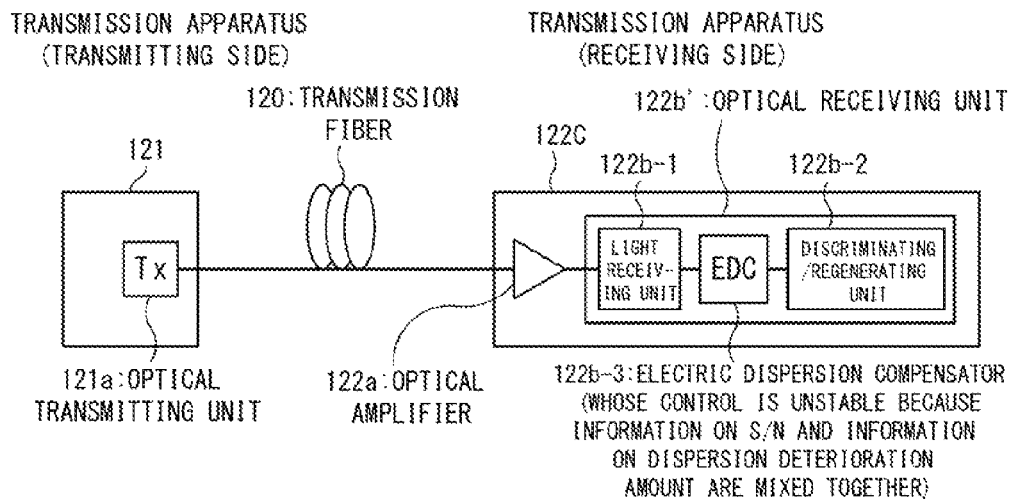

In the above signal light processing apparatus 20, the electric waveform distortion compensating unit 16 is provided, and the compensation amount determination controlling unit 15c determines and controls the compensation amount in the electric waveform distortion compensating unit 16. However, this invention is not limited to this example. As shown in FIG. 14, for example, an optical waveform distortion compensating unit (second waveform distortion compensating unit) 17 which variably compensates waveform distortion due to wavelength dispersion of signal light transmitted through a transmission path may be disposed in the front stage of the light receiving element 1, and the compensation amount determination controlling unit 15c as being a second waveform distortion compensation amount controlling unit may determine and control the compensation amount in the optical waveform distortion compensating unit 17 on the basis of the waveform distortion components on the high side and the low side. As the optical distortion compensating unit 17, a variable dispersion compensator using VIPA (Virtually Imaged Phased Array) may be applied, for example.

The transmission waveform distortion compensation amount operation controlling unit 15 may be configured mainly with firmware or the like. In which case, when functions as being the discrimination level operation controlling unit 5 and the detection time setting unit 6 according to the first embodiment are further added as functions of the firmware, it becomes possible to determine a distortion compensation amount from a waveform of a received signal light, and provide advantages similar to those of the first embodiment. In this case, the course of the arithmetic process in the operation in the discrimination level operation controlling unit 5 and the transmission waveform distortion compensation amount operation controlling unit 15 may be suitably shared.

What is claimed is:

1. A signal light processing apparatus comprising:
    a light receiving unit for converting input signal light to an electric binary signal; and
    a level detecting unit for detecting a high level component and a low level component contained in the electric binary signal from said light receiving unit, and a peak level on a high side and a peak level on a low side of the electric binary signal containing a noise,
    wherein said level detecting unit comprises:
    a high-level signal detecting unit for detecting the high level of the binary signal modulated on the signal light;
    a low-level signal detecting unit for detecting the low level of the binary signal modulated on the signal light;
    a high-side noise peak detecting unit for detecting the peak level of the electric binary signal containing the noise in a high-level area of the binary signal modulated on the signal light; and
    a low-side noise peak detecting unit for detecting the peak level of the electric binary signal containing the noise in a low-level area of the binary signal modulated on the signal light, and
    said light receiving unit comprises:
        a light receiving element for converting the signal light to an electric binary signal; and
        an amplifying unit for amplifying the electric binary signal from said light receiving element, and outputting a non-inverted signal according to a binary signal pattern of the main signal and an inverted signal obtained by inverting the binary signal pattern as amplified electric binary signals,
    said level detecting unit comprises:
        a first half-wave rectifier circuit for half-wave-rectifying the non-inverted signal; and
        a second half-wave rectifier circuit for half-wave-rectifying the inverted signal;
    said high-level signal detecting unit detects the high level on the basis of an output from said first half-wave rectifier circuit, and said high-side noise peak detecting unit detects the peak level on the high side of the electric binary signal containing noise on the basis of the output from said first half-wave rectifier circuit;
    said low-level signal detecting unit detects the low level on the basis of an output from said second half-wave rectifier circuit, and said low-side noise peak detecting unit detects the peak level on the low side of the electric binary signal containing noise on the basis of the output from said second half-wave rectifier circuit.

2. The signal light processing apparatus according to claim 1, said high-side noise peak level detecting unit and the low-side noise peak level detecting unit detect the peak levels of the electric binary signal containing the noise so as to meet a bit error rate required when data of the signal light is regenerated.

3. The signal light processing apparatus according to claim 1, wherein said high-level signal detecting unit comprises:
a first filter having a transmission band set to one-half or less of a frequency band of the main signal to transmit the output from said first half-wave rectifier circuit; and
a first peak detecting unit for detecting a peak level of components transmitted through said first filter;
said high-side noise peak detecting unit comprises:
a second filter having a transmission band set to the frequency band or less of the main signal to transmit the output from said first half-wave rectifier circuit; and
a second peak detecting unit for detecting a peak level of components transmitted through said second filter;
said low-level signal detecting unit comprises:
a third filter having a transmission band set to one-half or less of the frequency band of the main signal to transmit the output from said second half-wave rectifier circuit; and
a third peak detecting unit for detecting a peak level of components transmitted through said third filter; and
said low-side noise peak detecting unit comprises:
a fourth filter having a transmission band set to the frequency band or less of the main signal to transmit the output from said second half-wave rectifier circuit; and
a fourth peak detecting unit for detecting a peak level of components transmitted through said fourth filter.

4. The signal light processing apparatus according to claim 1 further comprising:
a discriminator for comparing a magnitude of a level of the electric binary signal outputted from said light receiving unit with a magnitude of a discrimination level to regenerate data; and
a discrimination level operation controlling unit for calculating the discrimination level by using the high level and the low level of the binary signal modulated on the signal light, and the electric binary signal levels contained in the high side and the low side of the binary signal detected by said level detecting unit, and setting the discrimination level to said discriminator.

5. The signal light processing apparatus according to claim 3 further comprising:
a discriminator for comparing a magnitude of a level of the electric binary signal outputted from said light receiving unit with a magnitude of a discrimination level to regenerate data;
a discrimination level operation controlling unit inputted the peak levels from said first peak detecting unit and said third peak detecting unit as the high level and the low level of the binary signal modulated on the signal light, and the peak levels from said second peak detecting unit and said fourth peak detecting unit as the electric binary signal levels contained in the high side and the low side of the binary signal, calculating the discrimination level by using the levels, and setting the discrimination level to said discriminator; and
a detection time setting unit for setting a time for which the peak levels are detected by said first to fourth peak detecting units.

6. The signal light processing apparatus according to claim 5, wherein the time set by said detection time setting unit is set according to a bit rate of the main signal, and a bit error rate of data regenerated by said discriminator.

7. The signal light processing apparatus according to claim 6, wherein said detection time setting unit sets the time on the basis of the bit rate of the main signal so that the time is practically equal to a time for which one bit error occurs in data regenerated by said discriminator.

8. The signal light processing apparatus according to claim 4, wherein said discrimination level operation controlling unit specifies a level area obtained by removing levels of noise signals contained in the high side and the low side from a level area between the high level and the low level of the binary signal modulated on the signal light, and calculating an intermediate point in the specified level area as the discrimination level.

9. A signal light processing apparatus comprising:
a light receiving unit for converting input signal light to an electric binary signal; and
a level detecting unit for detecting a high level component and a low level component contained in the electric binary signal from said light receiving unit, and a peak level on a high side and a peak level on a low side of the electric binary signal containing a noise,
wherein said level detecting unit comprises:
a high-level signal detecting unit for detecting the high level of the binary signal modulated on the signal light;
a low-level signal detecting unit for detecting the low level of the binary signal modulated on the signal light;
a high-side noise peak detecting unit for detecting the peak level of the electric binary signal containing the noise in a high-level area of the binary signal modulated on the signal light; and
a low-side noise peak detecting unit for detecting the peak level of the electric binary signal containing the noise in a low-level area of the binary signal modulated on the signal light, and
said level detecting unit further comprises:
a high-side high-frequency level detecting unit for detecting a level of a high-side frequency component, which is a high-frequency component contained in the high-level component of the electric binary signal from said light receiving unit; and
a low-side high-frequency level detecting unit for detecting a level of a low-side frequency component, which is a high-frequency component contained in the low-level component of the electric binary signal from said light receiving unit,
said signal light processing apparatus further comprises:
a high-side waveform distortion deriving unit for determining waveform distortion components contained in the high-level component of the electric binary signal by subtracting a level of high-side noise components from the level of the high-side frequency component detected by said high-side high-frequency level detecting unit; and
a low-side waveform distortion deriving unit for determining waveform distortion components contained in the low-level component of the electric binary signal by subtracting a level of low-side noise components from the level of the low-side frequency component detected by said low-side high-frequency level detecting unit.

10. The signal light processing apparatus according to claim 9, wherein said light receiving unit comprises:
a light receiving unit for converting the signal light to an electric binary signal; and
an amplifying unit for amplifying the electric binary signal from said receiving element, and outputting a non-inverted signal according to a binary signal pattern of the main signal and an inverted signal obtained by inverting the binary signal pattern as amplified electric binary signals;

said level detecting unit comprises:
- a first half-wave rectifier circuit for half-wave-rectifying the non-inverted signal; and
- a second half-wave rectifier circuit for half-wave-rectifying the inverted signal;

said high-level signal detecting unit detects the high level on the basis of an output from said first half-wave rectifier circuit, said high-side noise peak detecting unit detects a peak level on the high-level component of the electric binary signal containing the noise on the basis of the output from said first half-wave rectifier circuit, said high-side high-frequency level detecting unit detects a level of the high-frequency components in the output from said first half-wave rectifier circuit; and said low-level signal detecting unit detects the low level on the basis of an output from said second half-wave rectifier circuit, said low-side noise peak detecting unit detects the peak level on the low-level component of the electric binary signal containing the noise on the basis of the output from said second half-wave rectifier circuit, and said low-side high-frequency level detecting unit detects a level of the high-frequency components in the output from said second half-wave rectifier circuit.

11. The signal light processing apparatus according to claim 10, wherein said high-level signal detecting unit comprises:
- a first filter having a transmission band set to one-half or less of a frequency band of the main signal to transmit the output from said first half-wave rectifier circuit; and
- a first peak detecting unit for detecting a peak level of components transmitted through said first filter;

said high-side noise peak detecting unit comprises:
- a second filter having a transmission band set to the frequency band or less of the main signal to transmit the output from said first half-wave rectifier circuit; and
- a second peak detecting unit for detecting a peak level of components transmitted through said second filter;

said low-level signal detecting unit comprises:
- a third filter having a transmission band set to one-half or less of the frequency band of the main signal to transmit the output from said second half-wave rectifier circuit; and
- a third peak detecting unit for detecting a peak level of components transmitted through said third filter;

said low-side noise peak detecting unit comprises:
- a fourth filter having a transmission band set to the frequency band or less of the main signal to transmit the output from said second half-wave rectifier circuit; and
- a fourth peak detecting unit for detecting a peak level of components transmitted through said fourth filter;

said high-side high-frequency level detecting unit comprises:
- a fifth filter having a transmission band set to a high-frequency band centered at the frequency band of the main signal to transmit the output from said first half-wave rectifier circuit; and
- a fifth peak detecting unit for detecting a peak level of components transmitted through said fifth filter; and said low-side high-frequency level detecting unit comprises:
- a sixth filter having a transmission band set to a high-frequency band centered at the frequency band of the main signal to transmit the output from said second half-wave rectifier circuit; and
- a sixth peak detecting unit for detecting a peak level of components transmitted through said sixth filter.

12. The signal light processing apparatus according to claim 9 further comprising:
- a first waveform distortion compensating unit for compensating waveform distortion components contained in the electric binary signal from said light receiving unit with an electric amount; and
- a first waveform distortion compensation controlling unit for controlling a compensation amount in said first waveform distortion compensating unit on the basis of the waveform distortion components obtained by said high-side waveform distortion deriving unit and said low-side waveform distortion deriving unit.

13. The signal light processing apparatus according to claim 9 further comprising:
- a second waveform distortion compensating unit for optically compensating waveform distortion components contained in signal light before received by said light receiving unit; and
- a second waveform distortion compensation controlling unit for controlling a compensation amount in said second waveform distortion compensating unit on the basis of the waveform distortion components obtained by said high-side waveform distortion deriving unit and said low-side waveform distortion deriving unit.

14. The signal light processing apparatus according to claim 4, wherein said discrimination level operation controlling unit calculates a discrimination level from the high level component, the low level component and the peak level in the high side detected by said level detecting unit, and a required data bit error rate and set said discrimination level to discriminator.

15. The signal light processing apparatus according to claim 1, further comprising:
- a waveform distortion deriving unit that determines waveform distortion amount information on said signal light inputted into said light receiving unit, and
- a compensation amount determination controlling unit that determines a setting of a distortion compensation amount for an electric dispersion equalizer integrated in a receiver, and controls said electric dispersion equalizer.

16. The signal light processing apparatus according to claim 1, further comprising:
- a waveform distortion deriving unit that determines waveform distortion amount information on said signal light inputted into said light receiving unit, and
- a compensation amount determination controlling unit that determines a setting of a distortion compensation amount for an optical dispersion compensator disposed in front of an input unit of a receiver, and controls said optical dispersion compensator.

* * * * *